US007930069B2

(12) United States Patent
Savelle, Jr. et al.

(10) Patent No.: US 7,930,069 B2
(45) Date of Patent: Apr. 19, 2011

(54) IRRIGATION FLOW CONVERTER, MONITORING SYSTEM AND INTELLIGENT WATER MANAGEMENT SYSTEM

(75) Inventors: William C. Savelle, Jr., Mckinney, TX (US); William F. Cain, North Richland Hills, TX (US); Venkataramu L. Bangalore, Plano, TX (US)

(73) Assignee: Telsco Industries, Inc., Garland, TX (US)

(*) Notice: Subject to any disclaimer, the term of this patent is extended or adjusted under 35 U.S.C. 154(b) by 161 days.

(21) Appl. No.: 12/150,201

(22) Filed: Apr. 24, 2008

(65) Prior Publication Data
US 2009/0271045 A1 Oct. 29, 2009

(51) Int. Cl.
G05B 11/01 (2006.01)
G05D 7/00 (2006.01)

(52) U.S. Cl. ............. 700/284; 700/19; 137/624.12; 239/68

(58) Field of Classification Search ........... 700/284; 137/624.12, 624.15; 239/68
See application file for complete search history.

(56) References Cited

U.S. PATENT DOCUMENTS

| 4,209,131 | A * | 6/1980 | Barash et al. ............. 239/68 |
| 5,097,861 | A * | 3/1992 | Hopkins et al. ........... 137/78.3 |
| 5,479,339 | A | 12/1995 | Miller |
| 6,227,220 | B1 | 5/2001 | Addink |
| 6,314,340 | B1 | 11/2001 | Mecham et al. |
| 6,369,719 | B1 | 4/2002 | Tracy et al. |
| 7,010,395 | B1 * | 3/2006 | Goldberg et al. ......... 700/284 |
| 7,058,478 | B2 * | 6/2006 | Alexanian ............... 700/284 |
| 2001/0049563 | A1 * | 12/2001 | Addink et al. ............ 700/19 |
| 2003/0183018 | A1 * | 10/2003 | Addink et al. ........... 73/861.69 |
| 2004/0181315 | A1 | 9/2004 | Cardinal et al. |
| 2004/0206405 | A1 | 10/2004 | Smith et al. |
| 2005/0251401 | A1 | 11/2005 | Shuey |
| 2006/0009928 | A1 * | 1/2006 | Addink et al. ............ 702/50 |
| 2006/0059977 | A1 | 3/2006 | Kates |
| 2006/0116791 | A1 | 6/2006 | Ravula et al. |

* cited by examiner

*Primary Examiner* — Ramesh B Patel
*Assistant Examiner* — Douglas S Lee
(74) *Attorney, Agent, or Firm* — Rudolph J. Buchel, Jr.

(57) ABSTRACT

The present invention is directed to an intelligent water management irrigation system for monitoring the total water usage for a billing site and preventing cumulative water usage from exceeding a water budget by adjusting the amount of water used for irrigation. Irrigation zone priority values are selected for each irrigation zone that specify a percentage of the full water need that the foliage in the zone can survive and are saved in an intelligent water management irrigation (IWMI) controller. The IWMI controller receives water usage information originating from a property's water meter and compares the measured water usage with the allowable water budget. Water usage is tracked separately for the household use and landscape use (irrigation). Prior to each irrigation cycle, the IWMI controller estimates the amount of water that will be needed by the landscape and for household use during the remainder of a billing cycle; household use is given precedence over landscape use. If the water budget will support both, irrigation can proceed normally. If the budget will not support both, the IWMI controller estimates the amount of water needed for the remainder of the billing cycle if only a priority watering amount is allocated for each landscape zone. If the water budget will support priority irrigation, landscape watering can proceed in priority irrigation mode. If the water budget will not support priority irrigation watering, the irrigation cycle is skipped and the water usage estimations are recalculated prior to the next irrigation cycle.

39 Claims, 25 Drawing Sheets

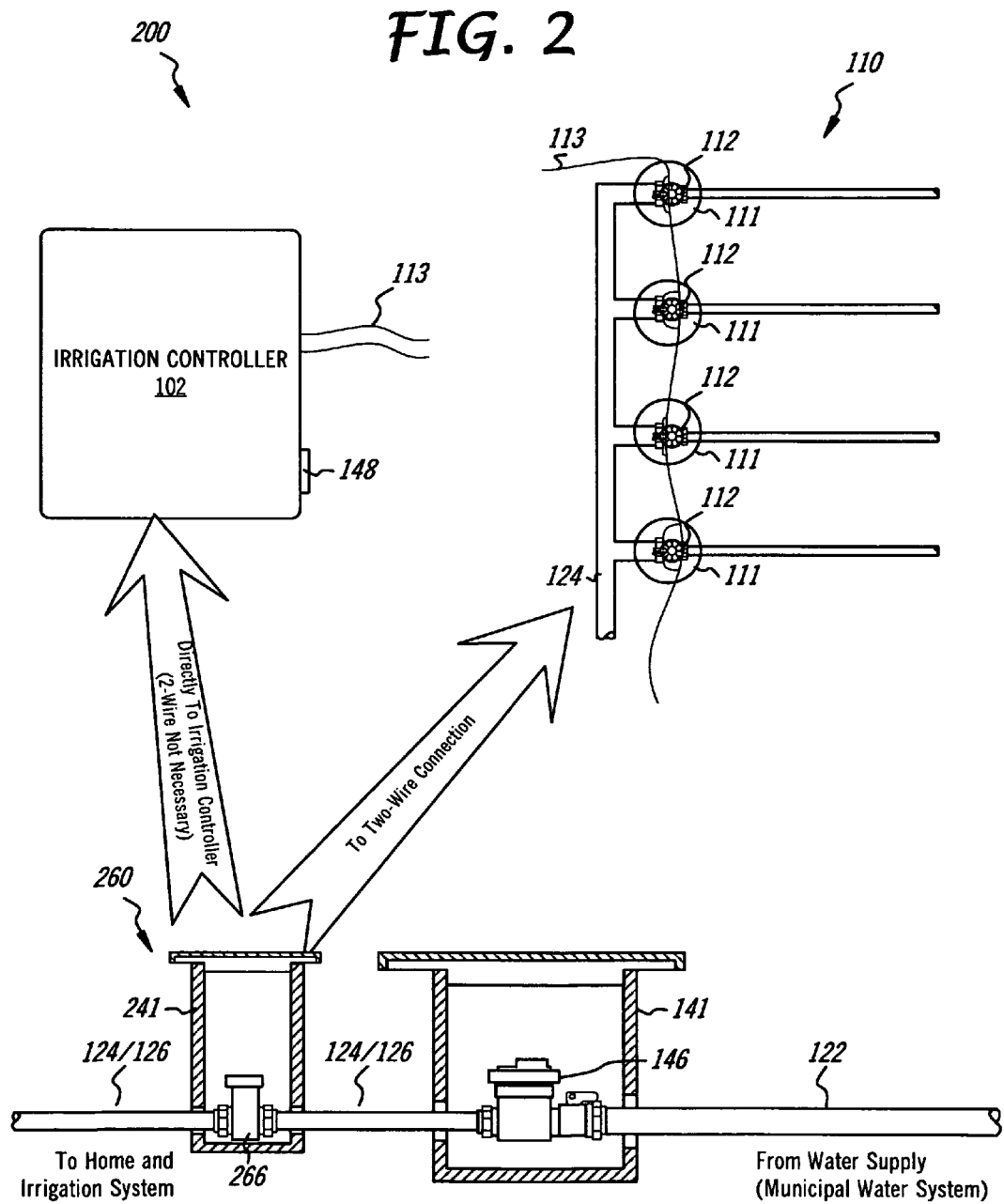

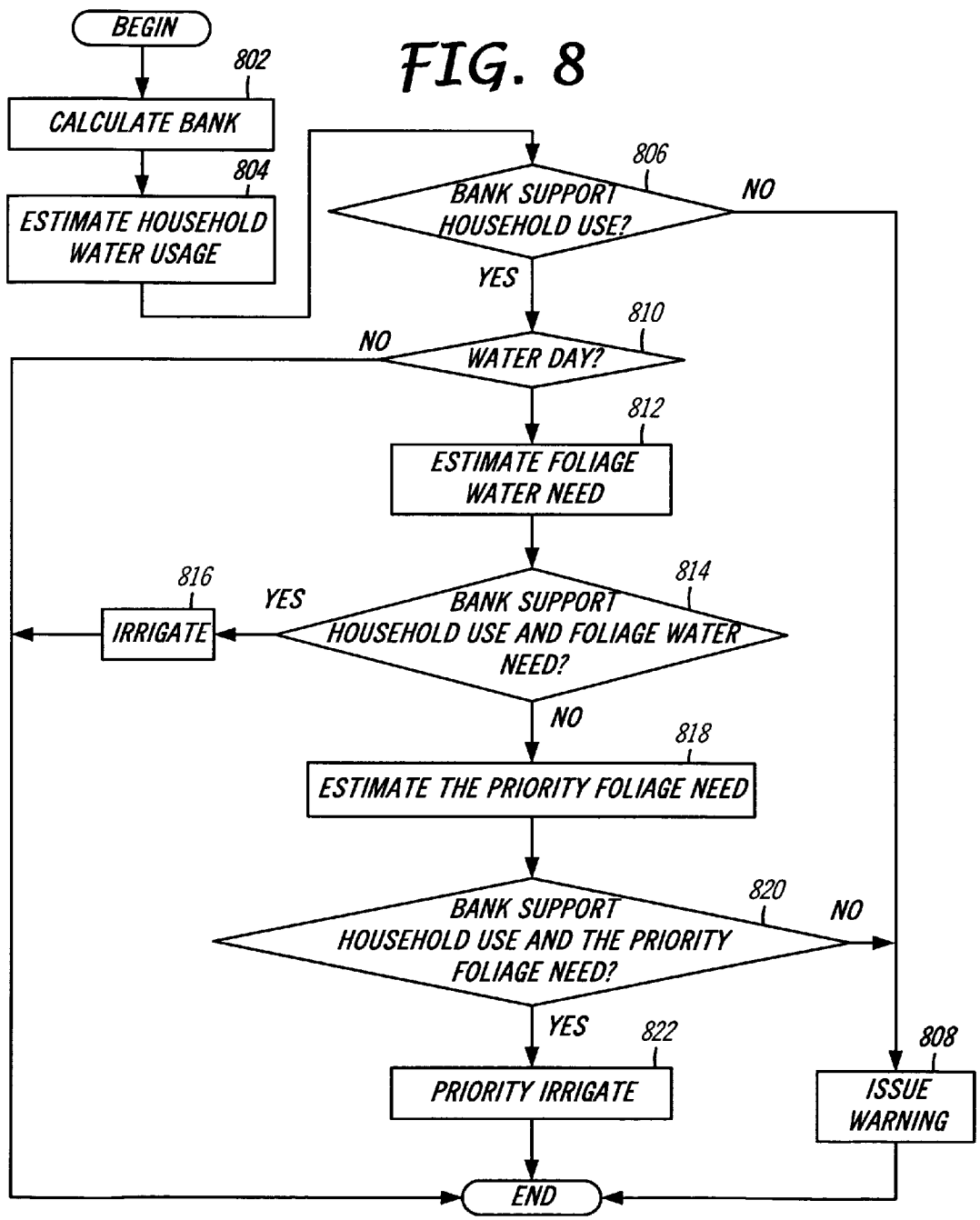

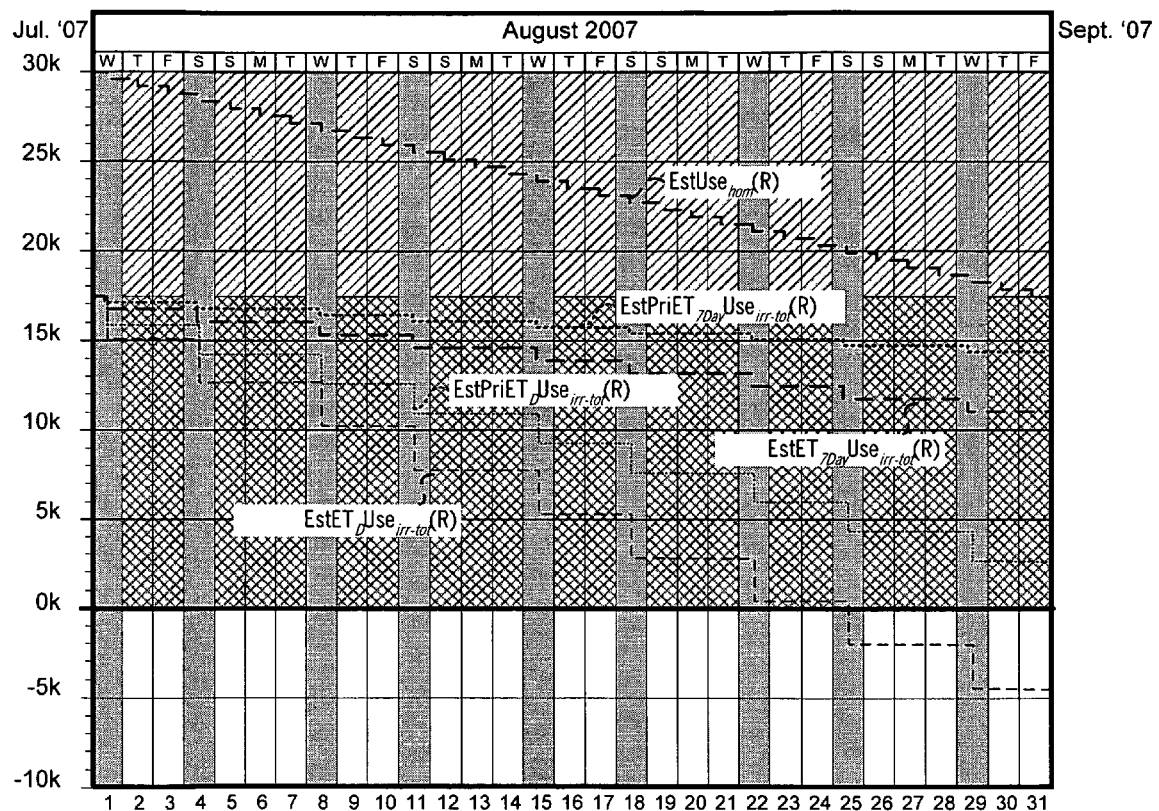
FIG. 11A
Day(D) = 1
Bank 
IrBank 
Day(D) = 1
UseCap(Cp) = 30k-gal
EstUse$_{hom}$(R) = 13.0k-gal
EstET$_D$Use$_{irr}$(R) = 22.3k-gal
EstPriET$_D$Use$_{irr}$(R) = 15.0k-gal
EstET$_{7DayAvg}$Use$_{irr}$(R) = 6.2k-gal
EstET$_{7DayAvg}$Use$_{irr}$(R) = 3.2k-gal
EstUse$_{tot}$(R) = 35.3k-gal

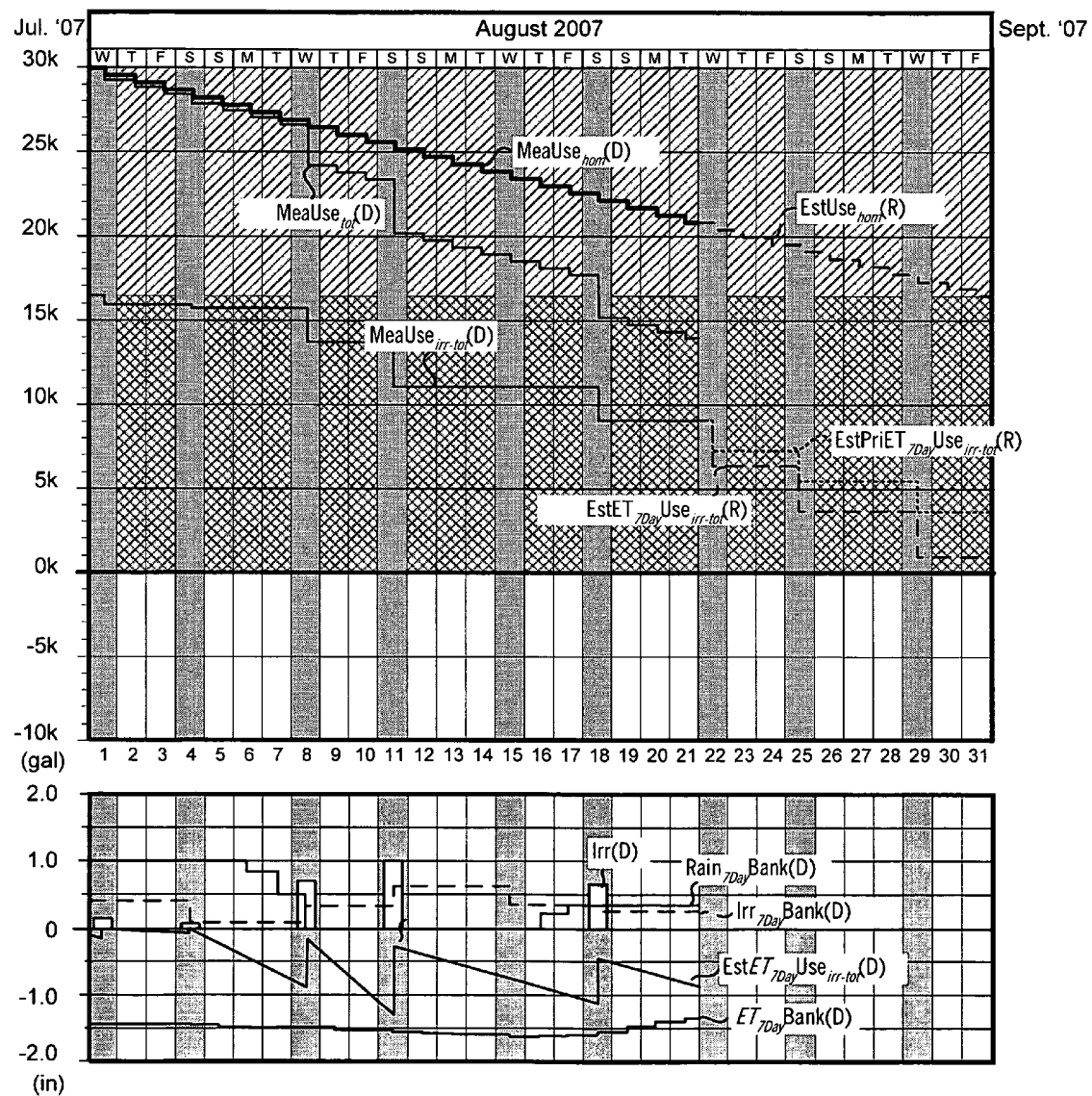

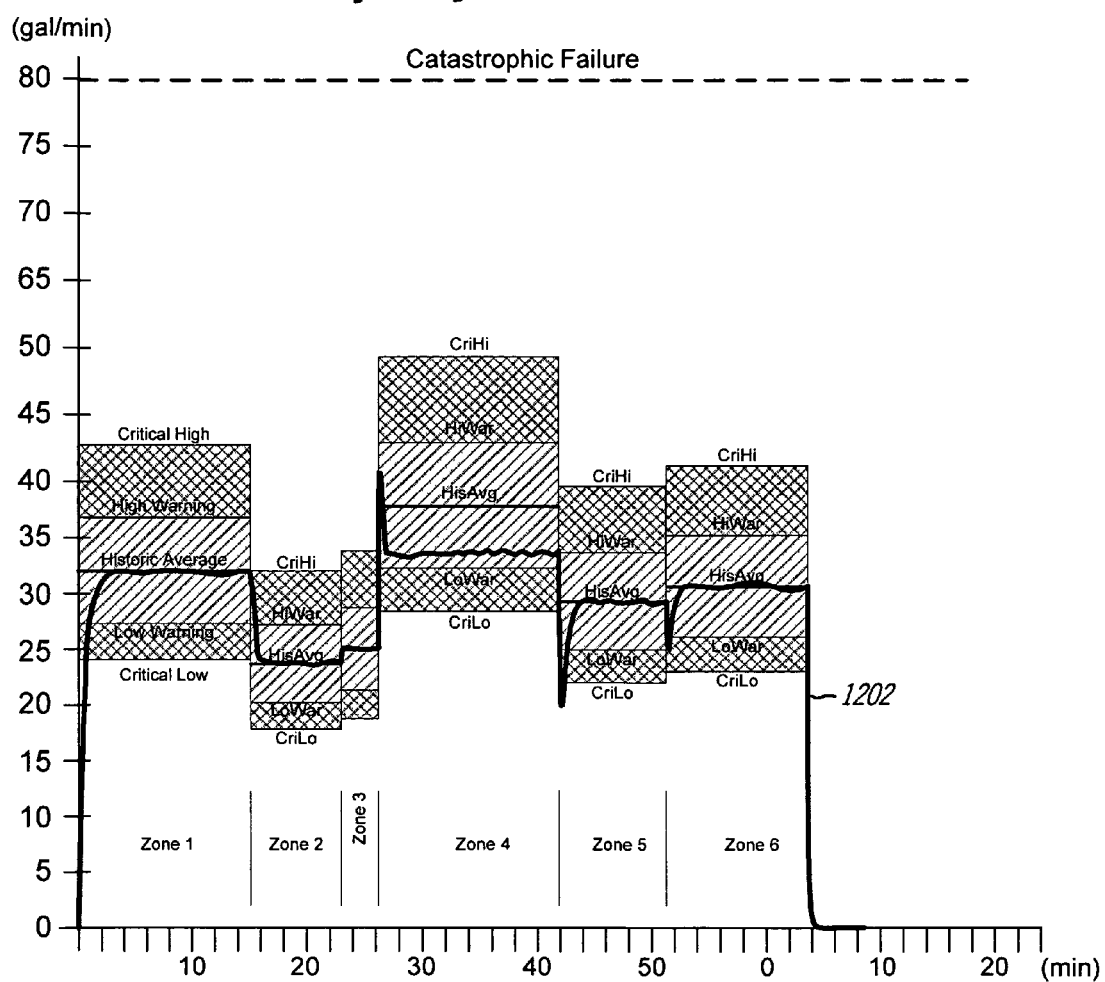

IRRIGATION FLOW CONVERTER, MONITORING SYSTEM AND INTELLIGENT WATER MANAGEMENT SYSTEM

BACKGROUND OF THE INVENTION

The present invention relates generally to an irrigation controller. More particularly, the present invention relates to a system, method and software program product for monitoring water usage and maintaining water use for a billing site below a preset amount through intelligent irrigation water management.

Measuring water flow at a billing site is usually performed by a water or service meter that is coupled to a public water supply pipe on the property. Legacy water meters include a mechanical displacement device for measuring positive displacement water flow from a municipal water supply to the billing site and a mechanical register for registering readings generated by the displacement meter (the displacement meter and register are linked mechanically). The typical meter installation is subterranean and protected under a valve box with a removable lid for accessing the meter for monthly water meter readings. A "meter reader" manually accesses the meter through the valve box lid and records the reading from the register.

More recently, legacy meters have been enhanced with automatic meter reading (AMR) technology by way of an electronic adapter device for sensing the register reading and converting the reading to an electronic signal for internal storage in a nonvolatile electronic memory. These devices run on replaceable batteries that last several months to several years. The electronic adapter device also includes an interface mechanism which enables the meter reader to access the register readings stored in the memory without manually opening the valve box lid or recording the register reading. The interface mechanism, typically a coil of wire, or an optical transducer, enables the meter reader to collect the information stored in memory with a handheld collection device (an electronic wand or portable computer) that utilizes a compatible interface. The meter reader merely positions the handheld collection device near the valve box and a communications link is automatically established with the electronic adapter device via the interface mechanism. Once the communication link has been established, water reading information in the memory is automatically uploaded to the collection device from the electronic memory in the electronic adapter device.

More advanced AMR water meters use an RF transmitter (for one-way communication) to broadcast water usage information through the air or an RF transceiver (for bi-directional communication) to query the AMR water meter for water usage information. AMR systems often make use of mobile interrogators or "Drive-by" mobile interrogation and collection units where a reading device is installed in a vehicle. In a two-way system, the mobile RF radio transceiver sends a signal to a particular AMR by its unique address or serial number. The message from the mobile unit causes the AMR water meter to wake up and respond with its water usage data. In a one-way communication AMR system, the local AMR meter's transmitter broadcasts its unique identifier and water usage readings continuously every few seconds. In this case, the mobile AMR device is merely a receiver that reads the RF data in the air and the AMR water device merely transmits the data. RF based AMR water meters usually eliminates the need for the meter reader to enter the property or home, or to locate and open an underground valve box. Most new water meters have fully integrated meter reading, electronic storage and transmission capabilities incorporated within the meter itself or have an interface for accepting an AMR unit.

More recently, AMR meters have been adapted for fixed network operations. The collection units for these networks employ a series of antennas, towers, collectors, repeaters, or other permanently installed infrastructure to collect transmissions of meter readings from AMR capable meters and get water use data to a central point without the use of a drive-by collection unit. These networks have taken advantage of Wi-Fi wireless communications as disclosed in U.S. Patent Publication 20050251401 to Shuey, filed May 10, 2004 entitled "Mesh AMR network interconnecting to mesh Wi-Fi network," which is incorporated by reference herein in its entirety.

None of the aforementioned units have been adapted for or interface with an irrigation controller or irrigation system. Typically, irrigation water usage information is obtained from a dedicated flow meter installed in the main pipeline leading to the irrigation circuit. Although some irrigation controllers can make use of water usage information to turn off the irrigation system once the water usage amount has surpassed a threshold amount, typically an adjustable electronic comparator is coupled to the flow meter that compares water usage from the flow meter to a threshold amount set by the operator. Once the threshold amount has been exceeded, the adjustable electronic comparator generates an OFF signal that is understood by most irrigation controllers to switch off the irrigation watering schedule.

Prior art irrigation controllers are known that can truncate an irrigation schedule if the irrigation water usage amount exceeds a threshold amount. Those systems receive water usage information from a dedicated flow meter and track the amount of irrigation used for a predetermined time period. When the water usage threshold is exceeded, the prior art controller deactivates the watering cycle until the next time period. For example, the operator may select a cap irrigation usage amount of 15,000 gallons for the monthly billing cycle. In that case, once the prior art irrigation controller senses that 15,000 gallons of water has been used, the watering cycle is deactivated until the next month. If this occurs early in the billing cycle, it may have a devastating effect on the landscape of the operator's home.

BRIEF SUMMARY OF THE INVENTION

The present invention is directed to an intelligent water management system and an apparatus for implementing the same. Automatic meter reading (AMR) technology is well known and in use in many or most municipalities for reading water meters located at a property. The present invention interfaces with AMR technologies and transmits the meter readings to the intelligent water management irrigation (IWMI) controller for use in its intelligent water management computations and health assessments of the irrigation system. In accordance with one exemplary embodiment, an AMR converter of the present invention converts water usage data generated by a local AMR to a format that is understood by the irrigation controller. The AMR converter is installed proximate to the AMR device and its backside interfaces with the AMR in the same manner as the meter reader's collection device, for example, through inductive coil coupling or IR coupling with the AMR device. The front side of the AMR converter is configured to communicate with the irrigation controller, for instance over a two-wire irrigation network or wireless signals. In operation, the AMR converter may operate in a bidirectional communication mode with the irrigation controller to interrogate the AMR, or merely transmit water usage data to the controller at a predetermined time of event intervals (unidirectional communications mode). Alternatively, if the particular AMR device permits, the irrigation controller itself will communicate directly with the AMR device via wireless communication protocol resident in the AMR device. In that case, whenever the irrigation controller needs water usage information for a calculation, it can acquire fresh data in real-time by requesting the same from the AMR device.

The purpose of the IWMI controller is to: 1) autonomously manage the amount of water used by the billing site for a predetermined water billing cycle; 2) permit the operator to set values for water management criteria and enable the operator to make inter-cycle and intra-cycle adjustments to the water management criteria values; 3) alert the operator of impending shortfalls in the amount of water for the billing site early in a billing cycle; 4) monitor the health of the irrigation and home use systems; 5) alert the operator of non-critical health issues; and 6) invoke immediate autonomous action when a critical health issue is detected.

Essentially, the operator assesses how much water the billing site should use over the billing cycle and sets that amount as the maximum water usage amount or the usage cap amount. Water usage will be thought of in a "banking metaphor," water that will be used at the billing site is "in the bank." The maximum water usage amount is the amount of water available in the bank at the beginning of a billing cycle. As water is consumed on the property, the actual water usage amount will be subtracted from the bank amount, hence the bank amount will decrease during the billing cycle. Household use is given precedence by the IWMI controller over irrigation water use. Therefore, the IWMI controller will not commence an irrigation cycle unless the bank can support both the household water use for the remainder of the billing cycle and the irrigation water use. Consequently, the IWMI controller estimates the amount of water that will be needed for household usage for the remainder of the billing cycle based on the recent rate of household water consumption. The IWMI controller continually compares that amount to the bank and if the bank amount is insufficient to cover the estimated household usage, i.e., the estimated amount of water in the bank is a negative amount, a water use warning is issued to the operator. The irrigation controller can only alter the amount of water devoted to irrigation, therefore, the IWMI controller continually monitors the cumulative amount of water actually used at the billing site and constantly adjusts the amount of water that is allocated to irrigation in order to ensure that enough water remains in the bank to fulfill the household water needs through the remainder of the billing cycle.

Allocating water for irrigation in any irrigation cycle is accomplished by first determining if the bank will support both the estimated water needs for the household and the landscape for the remainder of the billing cycle. The estimation is made prior to commencing an irrigation cycle. If the bank amount is sufficient, irrigation watering proceeds for the next irrigation cycle in an amount that meets the need of the landscape. If the bank amount is not sufficient, the irrigation controller determines if the bank amount can support both the household and a reduced amount of irrigation water usage for the remainder of the billing cycle. This reduced amount is based on priority watering to partially meet the landscape water needs for the individual irrigation zones for the remainder of the billing cycle. Generally, priority watering gives the foliage less water than it needs to flourish, but will provide the water necessary for life (i.e., the maintenance water needs). Under the priority watering allocation, some plant and grasses may go dormant and lose coloring, but will survive. If the bank will support household water usage and the priority irrigation allocation for the remainder of the billing cycle, irrigation watering proceeds at the reduced priority irrigation allocation. Conversely, if the bank will not support household water usage and either the entire landscape water needs or the reduced priority irrigation allocation, the next irrigation cycle is skipped and a water use warning issued.

The IWMI controller continually monitors water usage, even in non-irrigation time periods and on non-irrigation days, and 'learns' typical water usage patterns for the various water use modes at the property. Accordingly, the IWMI controller can evaluate irrigation and non-irrigation water usage in near real-time from the learned patterns and make intelligent assessments of the health of the entire water system, as well as evaluate, diagnose and predict potential problems with the irrigation system. In one example, the water flow in early morning time periods is monitored for above zero flow rates that may indicate a slight leak and a warning is issued. In another example, long periods of low water flow may indicate a leaking toilet, and the IWMI controller issues a warning. In still another example, if flow rates are detected that are higher than the highest measured flow rate, by some factor, a critical warning is immediately issued to warn of a catastrophic pipe breakage, optimally the IWMI controller will take immediate action under critical conditions to lessen loss or damage, such as by actuating an emergency shutoff valve. On the irrigation side, the IWMI controller monitors the amount/rate that water is drawn for each irrigation zone during a recent time period (a historic period) and that historical amount forms a basis for the controller to detect abnormally high or low water flow conditions in real-time or near real-time. In one example, a lower than normal flow rate in an irrigation zone may indicate that a sprinkler is plugged in that zone or the zone's irrigation valve is not opening properly. The controller then issues a warning directed to the irrigation zone with the low flow. Conversely, a higher than normal flow rate may indicate that the previous irrigation zone is closing slower than optimal or a problem in the zone, such as a damaged or broken irrigation pipe, or sprinkler head has popped off.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 2 is diagram depicting a separate AMR-irrigation system coupled directly to the output of a legacy water meter and in communication with an IWMI controller in accordance with another exemplary embodiment of the present invention;

FIG. 8 is a flowchart depicting a method of intelligent water management in accordance with an exemplary embodiment of the present invention;

FIGS. 11A through 11H diagrammatically depict water usage results for method of intelligent water management implemented in an IWMI controller in accordance with another exemplary embodiment of the present invention;

FIGS. 12A and 12B are diagrams depicting two different irrigation cycles and the corresponding irrigation flow rate profiles for the six irrigation zones using the present intelligent water management system in accordance with an exemplary embodiment of the present invention.

Other features of the present invention will be apparent from the accompanying drawings and from the following detailed description.

DETAILED DESCRIPTION OF THE INVENTION

Element Reference Number Designations

| Element Reference Number Designations |
|---|
| 100: Irrigation management system |
| 102: Intelligent water management irrigation controller |
| 110: Irrigation zone |
| 111: Valve box |
| 112: Irrigation solenoid valve |
| 113: Irrigation solenoid conductors |
| 122: Water supply line (municipal) |
| 124: Water supply line (irrigation) |
| 126: Water supply line (home) |
| 140: AMR-irrigation system |
| 141: Meter box |
| 142: AMR device (encoder-register) |
| 143: Converter conductors |
| 144: AMR converter |
| 146: Water meter |
| 148: Input port (AMR converter) |
| 150: Conversion unit |

| Element Reference Number Designations |
|---|
| 152: AMR interface |
| 154: Controller port |
| 156: Converter memory |
| 158: Power/battery |
| 200: Irrigation management system |
| 241: Meter box |
| 260: AMR-irrigation system |
| 266: AMR device (flow sensor) |
| 300: Irrigation management system |
| 302: Irrigation controller |
| 349: Transceiver (AMR converter) |
| 345: Wireless AMR converter |
| 402: Intelligent controller |
| 440: AMR system |
| 442: Wireless AMR device |
| 460: Repeater/collector |
| 500: Irrigation system |
| 502: Irrigation controller |
| 509: Communication interface |
| 512: Microprocessor |
| 514: Read only memory |
| 516: Random access memory |
| 518: Address bus |
| 520: Data bus |
| 532: Serial communications port |
| 542: Sprinklers |
| 546: User Interface |
| 548: I/O interface |
| 550: Display |
| 552: Time of day clock |
| 556(1) Moisture sensor |
| 556(2) Rainfall sensor |
| 556(3) Wind sensor |
| 556(4) Temperature |
| 560: Remote interface |
| 570: AMR interface |
| 600: Intelligent water management irrigation controller |
| 602: Memory |
| 604: Clock |
| 606: Irrigation controller |
| 608: Emergency shutoff controller |
| 609: Communication controller |
| 610: Irrigation manager |
| 612: Irrigation calculator |
| 614: Evapotranspiration calculator |
| 616: Evapotranspiration bank |
| 618: ET bank |
| 620: Rainfall database |
| 630: Flow manager |
| 632: Usage calculator |
| 634: Flow calculator |
| 640: Intelligent flow manager |
| 642: Intelligent water calculator |
| 644: Water bank |
| 646: Irrigation bank |
| 648: Historical water use database |
| 650: Alert manager |
| 652: Irrigation use bank |

The present invention generally comprises a device and methodology for utilizing water usage invention already available at an automated meter reader (AMR) type water meter for adjusting an irrigation schedule.

Figure 1A:
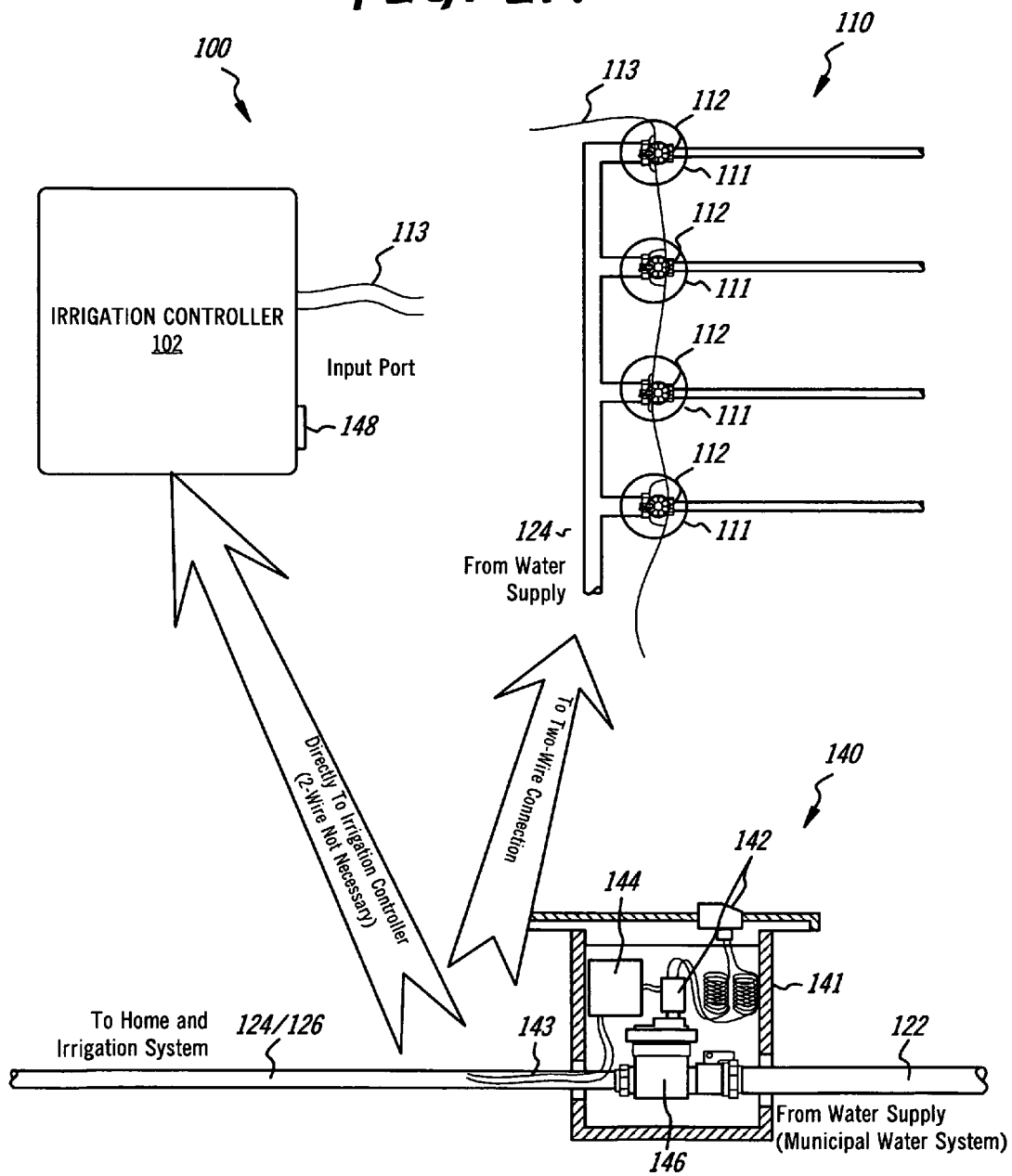
FIG. 1A is a diagram of an AMR irrigation water management system with a novel AMR converter in accordance with one exemplary embodiment of the present invention.
Figure 1B:
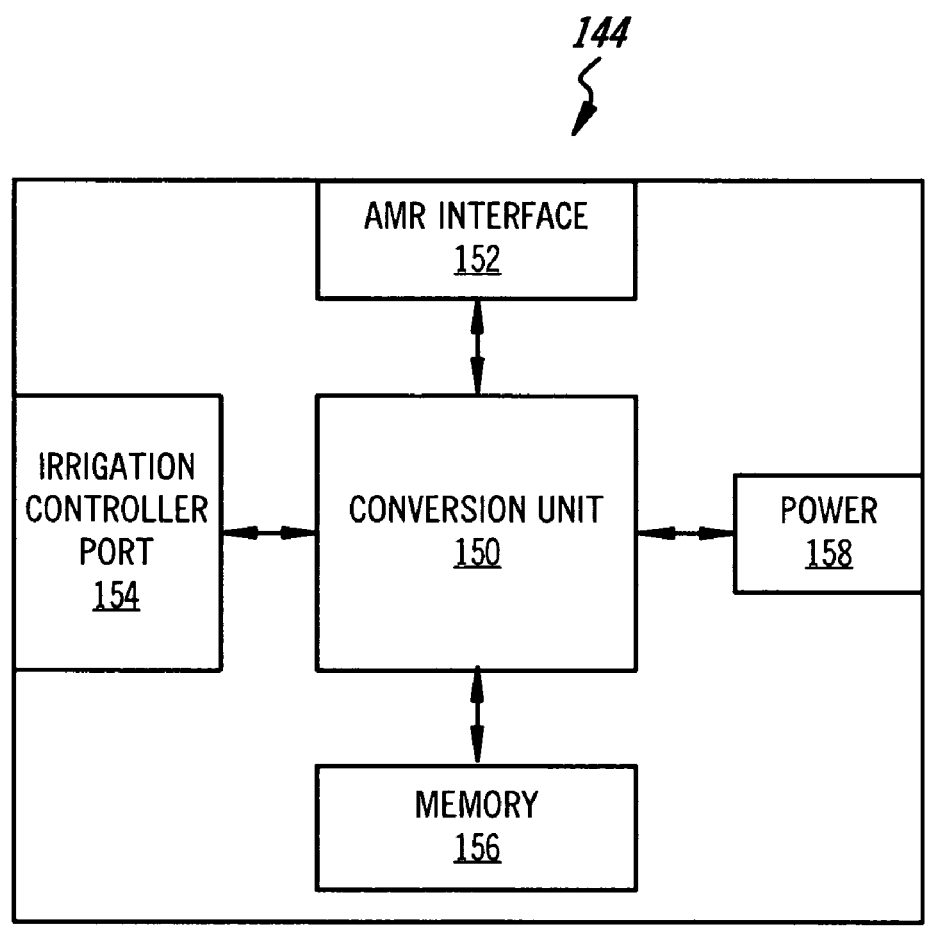
FIG. 1B is a diagram showing the logical components of an AMR converter in accordance with exemplary embodiments of the present invention.

FIGS. 1A and 1B are diagrams depicting an AMR irrigation water management system with a novel AMR converter in accordance with one exemplary embodiment of the present invention. The present AMR irrigation water management system 100 generally comprises three separate but cooperative subsystems: Intelligent water management irrigation controller (IWMI) 102 (such as the IWMI controller described below); water distribution zones 110; and AMR-irrigation system 140. The topology and composition for water distribution zones 110 is well known in the prior art as generally comprising a plurality of irrigation zones, each zone having solenoid operated irrigation valve 112 disposed within valve box 111 for controlling the flow of irrigation water to, for example, spray, drip or soaking types of water distribution devices. Irrigation valves 112 may operate on a multiwire operation principle wherein each of irrigation valves 112 is designated a separate conductor for controlling a solenoid actuator or using the two-wire operating principle wherein each or all of each of irrigation valves 112 are parallel coupled to a two-wire conductor pair through a two-wire decoder. The multiwire operation principle and multiwire type solenoid irrigation valves is disclosed in U.S. Pat. No. 6,314,340 to Mecham, entitled "Irrigation Controller," and U.S. patent application Ser. No. 11/202,442 to Doering entitled "Irrigation Controller with Integrated Valve Locator," each of which are assigned to the assignee of the present application and which are incorporated by reference herein in their entireties. The two-wire operation principle and two-wire decoders for use with solenoid irrigation valves are disclosed in U.S. patent application Ser. No. 11/983,086 to Savelle, entitled "Two-Wire Irrigation Decoder Manager" and assigned to the assignee of the present application and which is incorporated by reference herein in its entirety. Both multiwire and two-wire irrigation systems are well known in the relevant art.

AMR-irrigation system 140 comprises the well known components associated with typical water meter 146 (either residential or commercial, typically comprising either displacement, velocity or electromagnetic flow measurement systems), usually disposed within a subterranean meter box (depicted as meter box 141 in the figure). The meter is coupled between municipal water supply pipe 122 and irrigation/home supply pipes 124/126. Water meter 146 includes either an electronic or mechanical water usage register for viewing usage data. Typically, a shutoff valve is coupled in series with meter 146. AMR-irrigation system 140 further comprises a commercially available AMR device 142, sometimes referred to as an encoder-register because its primary function is to electrically encode water usage data and store it for subsequent reading or transmission.

AMR devices may be considered as either an integrated type or retrofit type of AMR encoder. The integrated type AMR is designed for new installations, or replacement, and integrates the automated meter reading encoder with the meter register, such as the Dialog 3S-DS available from Dialog Meter, Incorporated of Mansfield, Tex. Thus, installation for the integrated type requires the removal of the old meter at an existing site. Increasingly, these types of AMR meters include an electrically activated shutoff valve. The retrofit type of AMR encoder is designed to work with legacy meters, usually conventional water meters with a mechanical register. Although there are a number of variations, a typical retrofit AMR encoder optically or magnetically senses the sweep needle movement of a mechanical register and converts the sensor reading to water usage, such as the Firefly meter interface unit available from Datamatic, Ltd., Piano, Tex. Either of these types of devices are capable of electrically transferring water usage data to a data collector (e.g., walk-by, drive-by, fixed network, etc.), but heretofore this water usage data has not been accessible, or used in an irrigation controller. Optimally, AMR device 142 should be capable of calculating, registering and transmitting both the rate of flow and total flow data, but as a practical matter most conventional AMRs merely present water usage data.

Therefore, in accordance with one exemplary embodiment of the present invention, AMR converter 144 is combined with commercially available AMR device 142 for communicating with IWMI controller 102. FIG. 1B is a diagram showing the logical components of AMR converter 144. These include AMR interface 152 for interfacing with an AMR device, irrigation controller port for electrically coupling AMR converter 144 to IWMI controller 102, conversion unit 150 and power/battery 158 (supplemental and recharge power may be from external solar cell fitted externally to the lid of meter box 141). In accordance with one exemplary embodiment of the present invention, AMR converter 144 is installed proximate to AMR device 142 and its backside interfaces with the AMR in the same manner as the meter reader's collection device. For example, if the AMR employs touch technology, AMR interface 152 may be an inductive coil for coupling to the AMR's induction zone, or infrared optical scanning, AMR interface 152 will employ an IR transceiver in the line of sight of the AMR's optical port.

Conversion unit 150 receives messages, instruction and/or queries from the irrigation controller and converts those to impulses that can be understood by the electronics in AMR encoder-register 142 and then converts responses into a data protocol that can be used by IWMI controller 102. The data are then transferred from AMR converter 144 to IWMI controller 102 through irrigation controller port 154. Alternatively, conversion unit 150 may have embedded intelligence for autonomously interrogating AMR converter 144 without receiving instructions from IWMI controller 102. In so doing, AMR encoder-register 142 can interrogate water flow and usage data during periods while IWMI controller 102 is idle or otherwise not in communication with AMR encoder-register 142. For instance, conversion unit 150 will make flow conversions from water usage data at predetermined times or at predetermined retrieval frequencies and store both data in memory 156. The raw and processed data will be available in memory for retrieval from AMR encoder-register 144 by IWMI controller 102.

One transmission method is wired using dedicated AMR converter over conductors that are electrically coupled to input port 148. By using a dedicated input port, the data transmission need not conform to any specific transmission protocol so long as the data are understood by the irrigation controller. Alternatively, AMR converter 144 may format that the AMR water usage data in accordance with a standardized specification and used in conjunction with other devices that utilize that transmission specification, for instance the two-wire protocol. As discussed in U.S. patent application Ser. No. 11/983,086, each device coupled to a two-wire irrigation network is assigned a unique address and messages on a two-wire irrigation conductors generally conform to the following standard message format: <header><station_address><command><end>. The IWMI controller can communicate with specific devices on the two-wire network using this protocol. By employing the two-wire protocol, AMR converter 144 can be electrically coupled to a two-wire conductor path at the nearest valve box to the meter box, thereby alleviating long underground wire runs back to IWMI controller 102.

Many electronic water meters and AMR devices have one or more access ports for interfacing directly with the water usage registers and data thereon. For those situations, AMR converter 144 is merely coupled to the device using a weatherproof connection.

It should be mentioned that while AMR converter 144 is primarily intended for use with an existing AMR device, AMR converter 144 may instead be interfaced with its own encoder register. For instance, if the water meter is not equipped with an AMR device, one can be installed on meter 146 for exclusive use with AMR converter 144 and IWMI controller 102. Furthermore, most legacy meters have a rather large register face, whereby multiple AMR devices may be attached to meter 146 (not shown) while providing adequate visibility for visually reading/inspecting the meter face. In either case, memory (register) 156 may be provided onboard AMR converter 144 in cases where AMR converter 144 functions as the encoder register.

Legacy water meters without enhanced AMR technology may be fitted with an inline flow meter (either wired, such as a two-wire protocol, or wireless) for measuring water flow rates, storing water usage information and communicating water usage information to the irrigation controller. As shown in FIG. 2, a separate AMR-irrigation system 260 may be coupled directly to the output of legacy meter 146 between municipal water supply line 122 and irrigation supply pipe 124 and home supply pipe 126, for use (possibly exclusive) in accordance with another exemplary embodiment of the present invention. The aim here is to monitor water usage simultaneously with and separately from legacy meter 146, which will require AMR-irrigation system 260 be plumbed inline with meter 146, but probably installed in separate meter box 241. Here, AMR-irrigation system 260 may be as uncomplicated as a dedicated electrical flow sensor (generally without registering capabilities), or may instead be an advanced AMR device 266, capable of registering water usage data for subsequent interrogation by IWMI controller 102. It should be noted that although conventional flow sensors, such as the FS220B flow sensors available from Telsco Industries, Inc. of Garland, Tex., do not utilize the two-wire irrigation network protocol, they can be coupled to and powered through a two-wire conductor pair with other two-wire devices without interfering with the operation of those devices. Alternatively, conventional flow meters can be coupled directly to IWMI controller 102 on a dedicated conductor. Thus, AMR device 266 may be electrically coupled to IWMI controller 102 directly or over an existing two-wire irrigation zone. Optimally, AMR device 266 will be capable of calculating, registering and transmitting both the rate of flow and water usage data.

Figure 3:
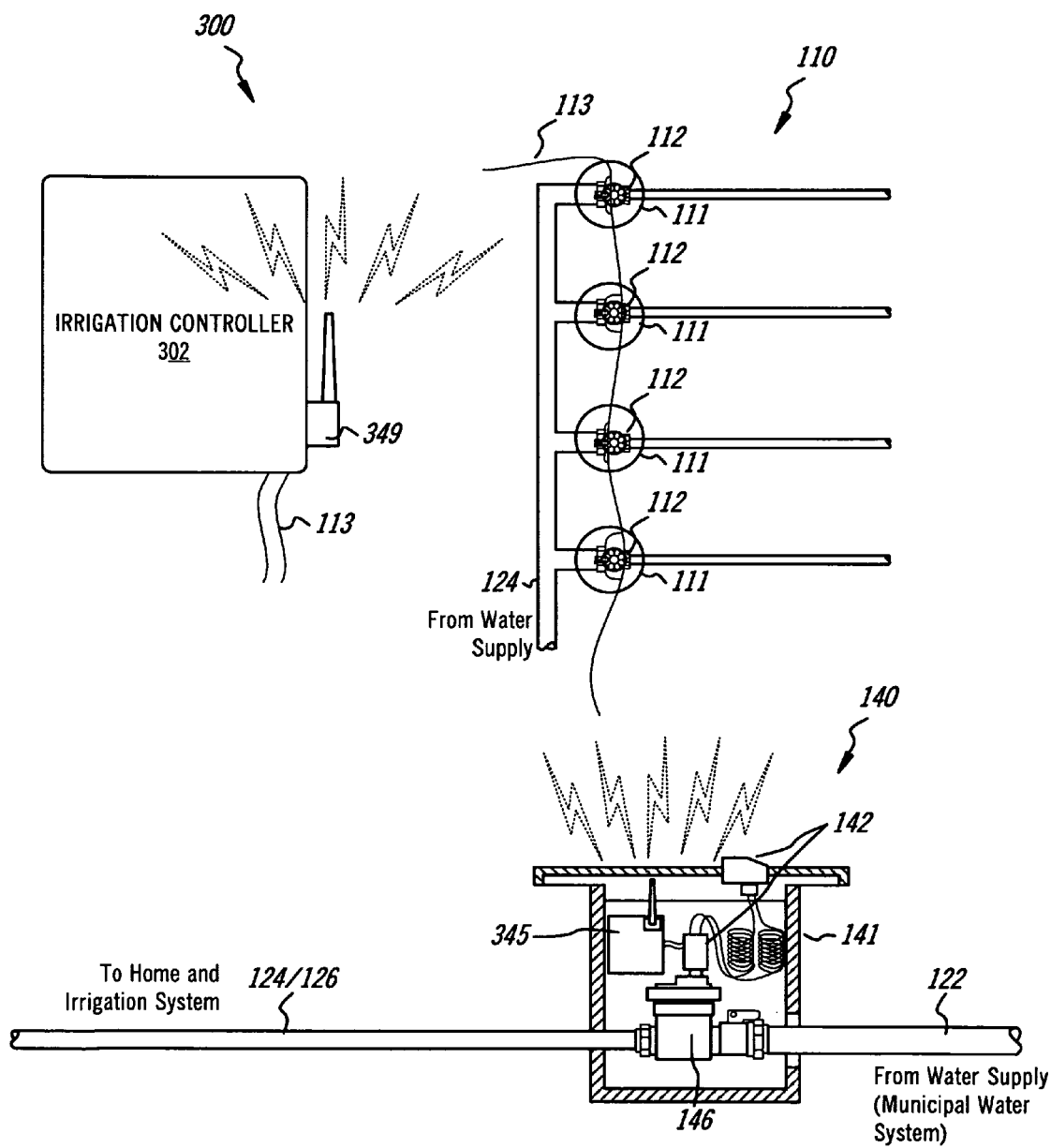
FIG. 3 is an AMR converter fitted with an RF transmitter/transceiver to communicate with a corresponding RF transmitter/transceiver located on the irrigation controller in accordance with another exemplary embodiment of the present invention.

In accordance with another exemplary embodiment, the AMR converter is fitted with an RF transmitter/transceiver to communicate with a corresponding RF transmitter/transceiver located on the irrigation controller, as depicted in FIG. 3. Here irrigation management system 300 is similar to that of system 100 shown in FIG. 1, with the exception of the transmission medium. One obstacle in implementing a wired intelligent water management system is that, in most locales, the municipal water meter is installed in the front of the property while the irrigation controller is almost always installed in the garage or in an outbuilding in the rear of the property. This often necessitates an extremely long underground wire run that may traverse sidewalks, driveways and foundations. The task is somewhat lessened if the irrigation system employs two-wire as the AMR converter may be connected to any conductor to a two-wire zone. These problems are overcome by fitting IWMI controller 302 with RF transceiver 349 for wirelessly communicating directly with AMR converter 345. AMR converter 345 is similar to that discussed in FIG. 1B, with the addition of a wireless transponder replacing or included in irrigation controller port 154 (as a practical matter AMR converter 345 may be a port for communicating on wired conductors or wireless airwaves). AMR converter 345 may transmit readings over any licensed or unlicensed radio frequency, but may instead be configured with controller 302 to operate over an IEEE 802.11x standard.

Figure 4:
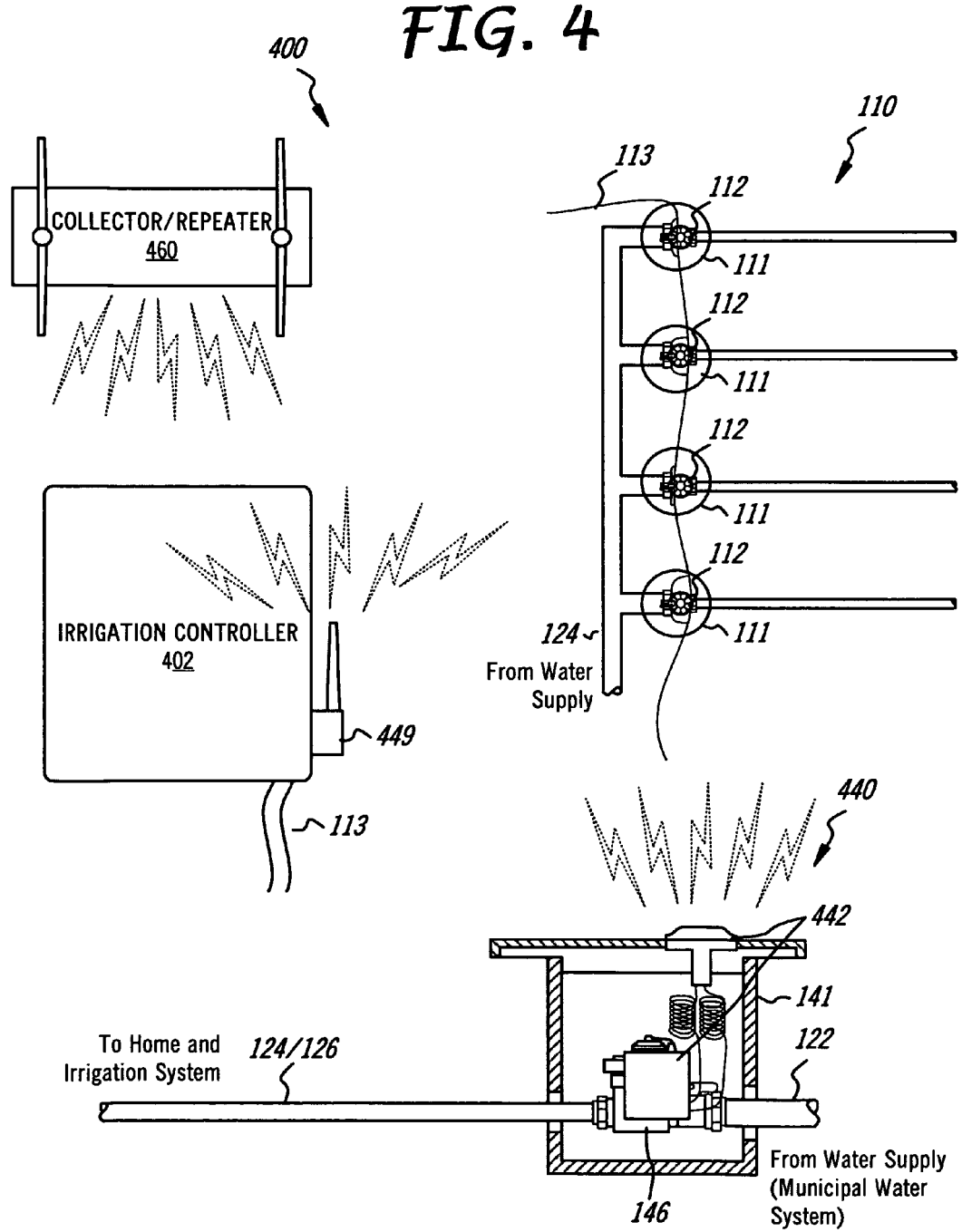
FIG. 4 is a diagram depicting an IWMI controller adapted to communicate with an existing wireless AMR device over its wireless communication medium in accordance with one exemplary embodiment of the present invention.

Finally, and in accordance with still another exemplary embodiment, the IWMI controller is adapted to communicate with an existing wireless AMR device over its wireless communication medium, as depicted in FIG. 4. AMR technology is migrating rapidly toward wireless communication over fixed and/or mesh networks, thereby eliminating all need for mobile collectors. Furthermore, the AMR devices themselves are evolving toward a unified, or at least more structured advanced metering infrastructure (AMI). These advanced metering capabilities are being sold to the consumers for their cost savings, with an ultimate goal of enabling the customer to more efficiently manage their own water usage. Municipal water utilities are excited with the additional data that these meters can capture that enable water departments to more accurately project and forecast water usage patterns and update these projections with real-time data. Many of these AMI-AMR systems capture not only water usage data but also log meter events. With their imbedded logic, AMI meters can be programmed to detect tampering, backflow and use violations of water restriction, as well as provide the municipality water utility with remote shutoff and resetting of any property. It is now possible for the municipal water utility to forecast and manage water usage profiles and promulgate water usage caps, guidelines and tiered billing structures. Ultimately, these new capabilities will be used by municipalities in conservation enforcement to detect use violations of water restrictions (e.g., unauthorized watering, including irrigating on restricted or rain days, over-watering and other use limit violations).

Returning to FIG. 4, AMR system 440 does not include any dedicated irrigation components such as an AMR converter, but instead comprises the municipalities' wireless AMR device 442. Wireless AMR device 442 utilizes a fixed, mesh or other wireless network that alleviates the necessity for mobile data collection. Typically, wireless AMR device 442 will communicate through a repeater to a central data collector or to a remote collector for temporary storage (represented as repeater/collector 460). The existence of this wireless network provides a ready access point for intelligent controller 402 to communicate with AMR device 442, either directly or via repeater/collector 460. This communication provides the property owner with the means to monitor total water usage for the billing site, and aid in the prevention of exceeding the allowable water budget set by the water utility by adjusting the water used by an irrigation system.

In the prior art it is known that irrigation controllers can truncate an irrigation schedule if the irrigation water usage amount exceeds a predetermined threshold amount. Those systems receive water usage information from a dedicated irrigation flow meter and track the amount of irrigation used for a predetermined time period. When the irrigation water usage threshold is exceeded, the prior art controller deactivates the watering cycle until the next time period. For example, the operator may select a threshold amount of 15,000 gallons for the monthly billing cycle. Once the prior art irrigation controller senses that 15,000 gallons of water has been used for irrigation, the watering cycle is deactivated until the next month. If this occurs early in the billing cycle, it may have a devastating effect on the landscape of the operator's home.

Therefore, in accordance with still another exemplary embodiment of the present invention, an intelligent water management system is disclosed. One aim of the present intelligent water management system is to regulate water use at a billing site below a predetermined maximum amount (referred to as the UseCap), by altering the amount of water that is allocated for irrigation. The UseCap is the amount of water available in the "bank" at the beginning of the billing cycle. As water is used on the property, for household use and irrigation use, the actual water usage amount is measured and subtracted from the bank amount (irrigation water use include irrigation water that results from both scheduled irrigation cycles and manually activated irrigating). Household water use is always given precedence over irrigation water use. The IWMI controller estimates the amount of water that will be needed for household usage for the remainder of the billing cycle and the remaining amount in the bank may be allocated for irrigation. If possible, the controller will allocate enough water for irrigation to satisfy the water needs of the landscape on the property, but will do so only if the bank can support equal amounts of water for irrigation in each of the irrigation cycles in the remainder of the billing cycle. The controller estimates the foliage water needs for the remainder of the billing cycle and if the bank can support both the estimated household use and estimated irrigation use for the remainder of the billing cycle, the current irrigation cycle proceeds. If not, the controller estimates a reduced irrigation amount based on priority watering to partially meet the foliage water needs for the remainder of the billing cycle. If the bank can support both the estimated household use and estimated priority irrigation water usage, priority watering proceeds. These and other aspects of the present invention will become apparent from the description of the invention present below.

Figure 5:
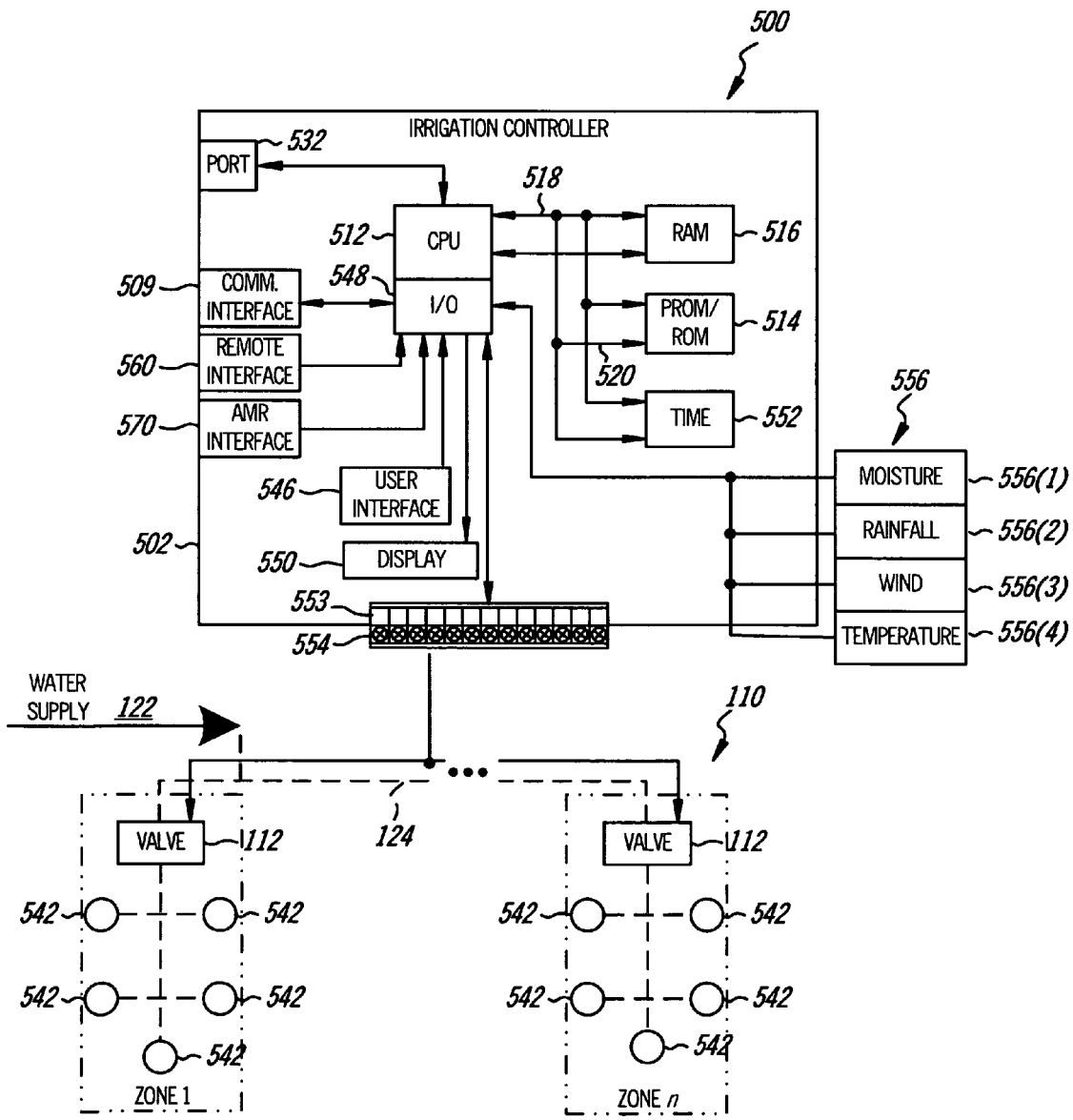
FIG. 5 is a block diagram illustrating an irrigation system employing an intelligent water management irrigation controller in accordance with an exemplary embodiment of the present invention.

FIG. 5 is a block diagram illustrating an irrigation system employing an intelligent water management irrigation controller in accordance with an exemplary embodiment of the present invention. Irrigation controllers, and the operation of which, may be generally understood from the disclosure of U.S. Pat. No. 6,314,340, issued to Mecham, et al., on Nov. 6, 2001, which is incorporated herein by reference in its entirety, therefore the present description will focus on only the features relating to intelligent water management. Each of valves 112 is connected between the water delivery network and the electrical control network and water supply 122 provides water to pipes 124, which are connected through valves 112, and onto water dispersion elements (sprinklers) 542. Each set of irrigation control valves 112 and associated water dispersion elements (sprinklers) 542 defines a particular irrigation zone 110 (such as irrigation zones 1, 2, 3, . . . , n). Valves 112 receive a control signal from IWMI controller 502, via control wire 113 utilizing either multi-wire of two-wire control principles, as discussed above with regard to FIG. 1.

With further reference to FIG. 5, a block diagram of IWMI controller 502 is depicted in accordance with an exemplary embodiment of the present invention. Irrigation system 500 comprises at least IWMI controller 502 and optionally, may further comprise other control components such as one or more evapotranspiration module (not shown) and/or remote controller (not shown). Some aspects of IWMI controller 502 function generally in the same manner as a conventional irrigation controller. In this regard, an irrigation schedule is programmed into IWMI controller 502 by an operator which specifies not only the day and time of day when irrigation should occur, but also the run time for irrigation in each zone (or program). IWMI controller 502 then operates to keep track of the irrigation schedule and control the actuation of irrigation control valves 112 in accordance with that schedule for the operator specified run time.

Optimally, it is envisioned that IWMI controller 502 controls valve actuation time periods by calculating the water needs of landscape that predominates a particular irrigation zone 110. The precise methodology is discussed in the U.S. Pat. No. 6,314,340 with further elaboration below. However, the present invention and water management concepts are in no way limited to more advanced irrigation or "evapotranspiration" type controllers, but may be employed in less sophisticated irrigation controllers in which the operator manually enters the valve activation times. In any case, the operator usually specifies the day and time of day when irrigation should occur, but the controller may choose an appropriate run time. Alternatively, an operator selected run time is modified by the controller calculated run time if the operator makes this selection. As depicted, IWMI controller 502 operates to process temperature data at the site and calculate a reference evapotranspiration value representing the amount of water lost through soil evaporation and the water used by a crop for growth and cooling purposes over some time period, such as a week or since the previous irrigation. This amount is commonly referred to as the "ET deficit" for the time period. As mentioned elsewhere, some evapotranspiration approximations utilize other real-time sensory data for their calculations; these may include humidity, wind and solar radiation data. When evapotranspiration modules are in place, a separate temperature sensor (and anemometer, humidity sensor and solar radiation sensor as necessary) is connected to each evapotranspiration module which then calculates a separate reference evapotranspiration value at those remote sites. This information is then communicated to IWMI controller 502. In response to receipt of the evapotranspiration information, IWMI controller 502 calculates the estimated foliage water requirement in each zone 110. Alternatively, intelligent water management IWMI controller 502 makes all evapotranspiration approximation calculations on board using sensory reading from the appropriate sensors for the irrigation zone 110.

Most conventional irrigation controllers calculate a run time for each zone 110 (or program), and then operate to control the actuation of irrigation control valves 112 in accordance with the irrigation schedule and for the duration of the calculated run time. The present intelligent water management controller, on the other hand, receives water use data (MeaUse$_{irr-i}$) via AMR interface 570 which communicates with any or all of AMR irrigation systems 140, 260 and 440. Thus, intelligent water management IWMI controller 502 can meter out the precise amount of water required by each zone 110 and control valves 112 can be deactivated immediately when the precise foliage water needs have been met.

IWMI controller 502 includes microprocessor (Main CPU) 512, programmable read only memory (ROM/PROM) 514 and random access memory (RAM) 516. ROM/PROM 514 provides a non-volatile storage location for the programming code of the IWMI controller along with certain important (permanent) data necessary for execution of the code. RAM 516 provides a volatile storage location for certain (variable/temporary) data generated during execution of the programming code. Microprocessor 512 communicates with ROM/PROM 514 and RAM 516 in a conventional manner utilizing address bus 518 and data bus 520. The evapotranspiration module, if present, also includes a microprocessor connected to a programmable read only memory (ROM/PROM) and a random access memory (RAM), and functions in a similar manner to the irrigation controller.

Communication between wired external devices is achieved using serial communications port 532, which is connected to (or is incorporated in) the microprocessor 512 to support communications between the IWMI controller 502 and external devices such as an evapotranspiration module(s), a portable flash memory drive (not shown), or a personal/laptop computer (not shown). Similarly, a second communications port is connected to (or is incorporated in) any external device or module to be connected to IWMI controller 502. AMR interface 570 may be a dedicated interface/controller for communicating with any of AMR irrigation systems 140, 260 and 440, either over wired or wireless medium. Alternatively, if IWMI controller 502 is adapted for two-wire operation, the function AMR interface 570 is performed by I/O 548 and AMR irrigation system communication is handled with all other two-wire devices in zones 110.

User interface 546 for supporting data entry into controller 502 is connected to microprocessor 512 through I/O interface 548. Input data may, if necessary, be stored in RAM 516. Furthermore, using a serial communications link (not shown), operator interface 546 input data may be communicated to an evapotranspiration module (also not shown) for storage in its onboard RAM.

Display 550 (such as an LCD display) for supporting visual data presentation by IWMI controller 502 is also connected through I/O interface 548 to microprocessor 512. Through display 550, IWMI controller 502 may present information to the operator (such as time, day and date information). Display 550 may further be utilized by microprocessor 512 to present a variety of menus for operator consideration when entering data into IWMI controller 502 and evapotranspiration module, or inform the operator concerning the errors, status or the state of controller operation. Optionally, IWMI controller 502 may include communication interface/controller 509 for sending and receiving messages and instructions. This provides a means for issuing messages to the operator concerning the health of IWMI controller 502, the AMR-irrigation system or the water systems. Communication interface/controller 509 may provide an IP messaging linkage via email or voice and/text telephony linkage, or linkage to some other medium that is used by the operator.

A time of day clock 552 is connected to microprocessor 512 through address bus 518 and data bus 520. This clock 552 maintains a non-volatile record of month, day, hour of the day, minutes of the hour and seconds of the minute. Clock 552 time data is monitored by microprocessor 512 with the time data driving certain operations by IWMI controller 502 and an evapotranspiration module in accordance with their programming codes. These operations include: reading and storing temperature data; initiating and stopping irrigation activities; and performing certain irrigation related calculations.

IWMI controller 502 optionally receives input from other sensors 556 through I/O interface 548. An example of such a sensor is moisture sensor 556 (1). When the moisture sensor 556 (1) detects moisture, this is indicative of a rainfall event. During such a rainfall event, microprocessor 512 suppresses controller 502 actuation to sprinkle. Another example of such a sensor comprises rainfall gauge sensor 556(2). Using rainfall information collected by rainfall gauge sensor 556(2), microprocessor 512 adjusts (i.e., reduces or suppresses) its programming code calculated irrigation amount of water which is needed to replace water lost through the effects of evapotranspiration. Anemometer 556(3) is optionally provided for certain types of evapotranspiration approximations and is connected to microprocessor 512 through input/output (I/O) interface 548. Temperature sensor 556(4) is further provided and is connected to microprocessor 512 through input/output (I/O) interface 548. In accordance with the operation of the programming code, temperature data collected by sensor 556(4) is stored by microprocessor 512 in RAM 516. Additionally, and not shown, a solar radiation sensor may be present. It should be understood that on a typical home site, only one set of senses is necessary for providing adequate reading for producing accurate evapotranspiration approximations, however on larger properties, e.g., campuses, golf courses and the like, multiple sets of sensors may be necessary for accurate evapotranspiration approximations in the disparate irrigation zones.

Figure 6:
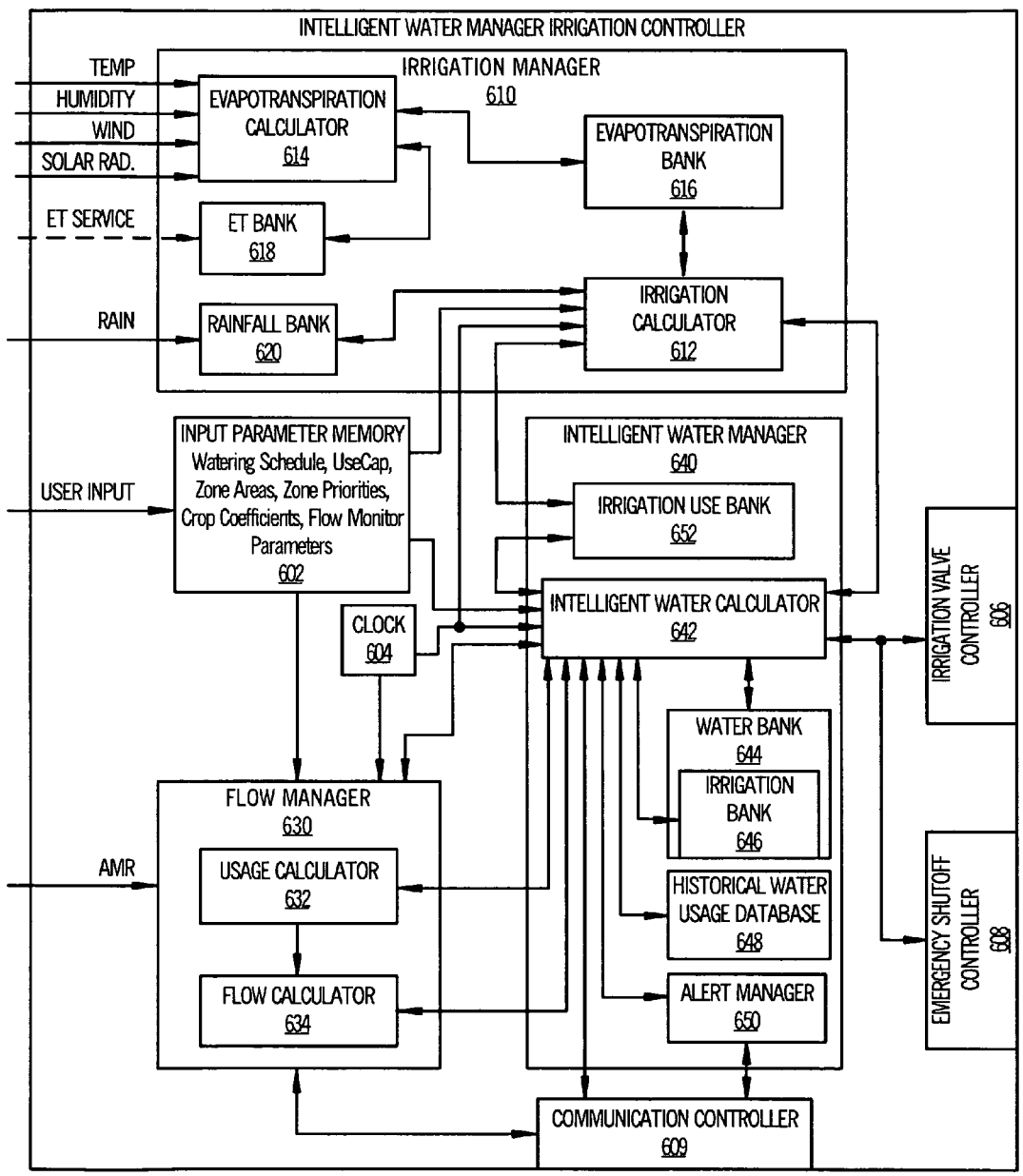
FIG. 6 is a block diagram illustrating the logical elements of an intelligent water management irrigation controller in accordance with an exemplary embodiment of the present invention.

Many of the features of IWMI controller 502 are embodied in software or firmware and therefore not readily apparent for the discussion of the physical components of the controller. Therefore, FIG. 6 is a block diagram illustrating the logical elements of an intelligent water management irrigation controller in accordance with an exemplary embodiment of the present invention. The functional aspects of intelligent water management IWMI controller 600 can be subdivided into three major logic subsystems: irrigation manager 610, flow manager 630, and intelligent flow manager 640, and various logical components that are not under the direct control of the three identified logic systems, e.g., memory 602, clock 604, IWMI controller 606, emergency shutoff controller 608 and communication controller 609.

The function of irrigation manager 610 is to calculate an appropriate amount of water for irrigation. Many conventional irrigation controllers modify the run time for irrigation in each zone based on some approximation, such as evapotranspiration, and not actual water usage. The present IWMI controller can calculate run times, as in the prior art, or may estimate irrigation water usage based on evapotranspiration. If real-time water use measurements ($MeaUse_{irr-i}$) are available from the AMR-irrigation system, then irrigation water usage estimates can be used for deactivating an irrigation zone once the measured amount of water equals the estimated irrigation water usage for the foliage in that irrigation zone. Alternatively, the present invention can operate on a hybrid run time/measured usage mode wherein irrigation run times are calculated from the evapotranspiration and historical measured flow rate for the particular zone.

In either case, irrigation manager 610 employs some means for calculating the 'crop' water requirement for the particular turf or foliage that predominates the landscape of each irrigation zone. One particularly useful method for estimating the landscape water requirement is by approximating by an evapotranspiration rate and accumulating the evapotranspiration rate over some time period. An evapotranspiration rate for an irrigation zone can be derived from a reference evapotranspiration ($ET_0$) approximation and adjusted for the type of vegetation in the zone. The evapotranspiration rate is accumulated over a time period and is offset by water received on the zone, i.e., rainfall or irrigation. This is commonly known as the ET deficit and is understood as an accurate indication of the complete foliage water requirement for the time period. If the ET deficit is a negative value, the water requirement of zone's foliage has not been satisfied and additional water must be supplemented through irrigation. The reference evapotranspiration rate cannot be measured directly and must, therefore, be estimated using an approximation technique, the more well known include Thornthwaite, Hamon, Turc, Priestley-Taylor, Makkink and Hargreaves-Samani. The Hargreaves method is disclosed and its use with advanced irrigation controllers is discussed in the U.S. Pat. No. 6,314,340. The Hargreaves method approximates $ET_0$ using only regional solar radiation data and local temperature readings, hence temporal temperature readings should be available for calculating $ET_0$ using the Hargreaves method. Other $ET_0$ approximations consider other factors such as relative humidity, wind, and direct solar radiation; the appropriate measurement reads should be available for the chosen approximation technique.

For the purposes of describing the present invention, the source of the reference evapotranspiration approximation is not as important as how the reference evapotranspiration is used in calculating the foliage water requirement for a current day D ($EstETUse_{irr-tot}(D)$) and estimating the future foliage water requirement for the remaining R days of the billing cycle (EstETUse$_{irr-tot}$(R)). Several factors should be considered prior to selecting an estimation method. One factor to consider is that unlike prior art irrigation controllers, the present intelligent water management irrigation controller does not necessarily allocate the entire amount of water required by the landscape. Therefore, an ET deficit may be carried over between watering cycles. This situation occurs when the water in the bank cannot support both irrigation and household water usages for the remaining R days in the billing cycle. Household water use is always given preference. Consequently, the amount of water allocated for irrigation is either reduced by a priority factor set by the operator (EstPriETUse$_{irr-tot}$(D)) or the irrigation cycle is skipped altogether. Generally, prior art irrigation controllers do not carryover ET deficits between irrigation cycles because it is assumed that these prior art controllers allocate enough water to completely satisfy the water requirement of the landscape. The problem of ET deficit carryover with the present intelligent water management irrigation controller could be mitigated by assuming that the foliage water requirement is completely satisfied each irrigation cycle regardless of the amount of irrigation water expended, in an identical manner as used by prior art irrigation controllers. However, this is not an optimal solution to the carryover problem for the present IWMI controller because the complete amount of water required by the foliage can never be realized if the true ET deficit is not accurately tracked between irrigation cycles. Furthermore, additional water may become available for irrigation in a subsequent irrigation cycle, i.e., the household water consumption may decrease or from rain after the irrigation cycle. In either case, it is possible that the previous irrigation cycle's ET deficit may be completely offset in the next irrigation cycle, thereby satisfying the remainder of the foliage water requirement carried over from the previous irrigation cycle. However, if the ET deficit is not accurately carried over from the previous irrigation cycle, any additional water that might be allocated for irrigation use will not be used for irrigation.

Therefore, in accordance with another exemplary embodiment of the present invention, irrigation manager 610 estimates the water needed by the landscape on the property by accumulating ET deficits over a rolling time period that carry over between irrigation cycles. Optimally, the rolling time period is shorter than one billing cycle and encompasses more than one irrigation cycle. For the purposes of describing the present invention, it is assumed that two days per week are designated as irrigation days (Wednesday and Saturday), therefore as used hereinafter, a seven day rolling accumulation time period has been selected for estimating the amount of irrigation water to satisfy the foliage water requirement (EstET$_{7Day}$Use$_{irr-tot}$(D)); the calculation is described below.

$$EstET_{7Day}Use_{irr-tot}(D) = \sum_{-(s/2+1)}^{T=D-1} \sum_{j}^{i=1} (ET_0(T)K_i - Rain(T) - MeaUse_{irr-i}(T)) \quad (1)$$

where D is the current day;
ET$_0$ is the reference evapotranspiration;
K$_i$ is the crop factor for zone i;
Rain(T) is the rainfall amount in period T;
MeaUse$_{irr-i}$(T) is the measured irrigation use in zone i during time period T;
S is a sample period (14 days); and
T represents a 24 hour time period.

At the beginning of a watering cycle, a value for EstET$_{7Day}$Use$_{irr-i}$(D) is passed to intelligent water calculator 642 for each of the j zones. Irrigation manager 610 provides a means for accumulating not only ET deficits (ET bank 618), but also for accumulating water offsets for the same time period (e.g., rainfall bank 620 and irrigation use bank 652, which is actually under the control of intelligent water manager 640).

Estimating the foliage water requirement for the remaining R days in a billing cycle is somewhat problematic. The maximum amount of irrigation water needed for a billing cycle may be represented as:

$$MaxEstUse_{irr-tot}(Cb) = \sum_{j}^{i=1} ET_0 K_i Cb \quad (2)$$

Where ET$_0$ is a reference evapotranspiration from day D=1 or the last day of the previous billing cycle;
K$_i$ is the crop factor for zone i; and
Cb is the number of days in the current billing cycle.

And therefore the maximum amount of irrigation water needed for the remaining R days in a billing cycle may be represented as:

$$MaxEstUse_{irr-tot}(R) = \sum_{j}^{i=1} ET_0 K_i R \quad (3)$$

Where ET$_0$ is a reference evapotranspiration from day D or the previous day in the billing cycle; and
R is the remaining days in the billing period Cb.

However, this approximation is too often pessimistic because it does not account for rain and at least some rain will probably fall in the billing cycle. Furthermore, if ET$_0$ is selected from a single day, the estimate will be at the mercy of the daily fluctuation of ET, which can be substantial. To reduce instability, the estimate should be based on some averaged ET$_0$, for instance between irrigation cycles.

At first blush, using the two-water cycle rolling accumulation time period (i.e., EstET$_{7Day}$Use$_{irr-tot}$(R)) would seem to be the most accurate approximation for estimating future water use for the reasons discussed above.

$$EstET_{7Day}Use_{irr-tot}(R) = \sum_{-(s/2+1)}^{T=D-1} \sum_{j}^{i=1} Icb(ET_0(T)K_i - Rain(T) - MeaUse_{irr-i}(T)) \quad (4)$$

where ET$_0$ is the reference evapotranspiration;
K$_i$ is the crop factor for zone i;
Rain(T) is the rainfall amount in period T;
MeaUse$_{irr-i}$(T) is the measured irrigation use in zone i during time period T;
Icb is the number of irrigation cycles in the current billing cycle Cb;
S is a sample period (14 days); and
T represents a 24 hour time period.

To determine the usefulness of using the two-water cycle accumulation approximation, three cases must be examined separately: the beginning of the billing cycle where the rolling accumulation period extends into the previous billing cycle, the end of the billing cycle and between the beginning and end of the cycle. At the beginning of the billing cycle, the ET deficit is at least partially due to an ET deficit that accrued prior to that billing cycle. Conversely, any rainfall in the latter days of the previous billing cycle will offset the ET for the current billing cycle. Thus, the estimation accumulating the foliage water requirement over a rolling time period will often yield more optimistic estimates than simply accruing ET deficits between irrigation cycles (Equation (2)) if rainfall was measured prior to the previous watering cycle. A more optimistic irrigation usage estimate is especially advantageous at the beginning of a billing cycle. Often, the estimate of foliage watering needs for the remaining R days of the billing cycle, $\text{EstETUse}_{irr\text{-}tot}(R)$ can be very pessimistic at the beginning of the billing cycle (i.e., where R≈Cb), where some of the ET deficit is from the previous water cycle. This happens because no rain was measured between irrigation cycles to offset the ET deficit and may force the IWMI controller to restrict or skip a water cycle early in the billing period. However, because rain is more apt to have fallen within the most recent two irrigation cycles than since the last cycle, the rolling seven day accumulation period is a more optimistic prediction (and perhaps more accurate) of the future foliage water requirement over a long time period (Cb>>D). Therefore, during the first week of a billing cycle it is advantageous to use an optimistic foliage water requirement approximation for estimating the watering needs for the remaining R days of the billing cycle.

Similarly, during the middle part of the billing cycle the rolling time period will yield a fairly accurate estimate of the foliage water requirement for the remaining R days of the billing period. However, at some point the reliance of past rainfall to predict future irrigation needs becomes a determent, recent rain is not an accurate predictor of future rain. In practice, an optimistic irrigation use estimate in the last week of the billing cycle may give the incorrect impression that the bank can support the foliage water requirement and the household water use for the remaining R days of the billing cycle (where D>R). The controller will then allocate the full amount of water required by the foliage rather than a lesser water allocation (the priority irrigation water use amount). If rain does not offset the ET deficit by the same amount as the approximation, subsequent irrigation use estimates will be far more pessimistic, possibly resulting in the IWMI controller skipping an irrigation cycle. If a less optimistic irrigation estimate is employed later in the billing cycle, which may be more accurate for short term irrigation estimates, the controller may initiate priority watering earlier in the billing cycle, thereby increasing the amount of water in the bank that is available for subsequent irrigation cycles and reducing the likelihood that an irrigation cycle is skipped later in the billing cycle. Therefore, optimally, irrigation calculator 612 should be able to switch between irrigation water estimation calculations to more accurately estimate the irrigation water needs during a billing cycle.

Continuing with FIG. 6, evapotranspiration calculator 614 approximates a reference $ET_0$, usually at midnight each day, but may also make an $ET_0$ approximation at the beginning of an irrigation cycle. Evapotranspiration calculator 614 uses the appropriate sensor measurements, for instance, daily high and low temperature readings, along with less volatile data, such as solar radiation, that may be stored in ET bank 618. Each ET approximation resulting from evapotranspiration calculator 614 is stored in evapotranspiration bank for use by irrigation calculator 612. Alternatively, evapotranspiration calculator 614 may merely retrieve ET values from ET bank 618 that originate from a commercial service and store that data in evapotranspiration bank for use by irrigation calculator 612.

Clock 604 communicates time information to the components in intelligent water management IWMI controller 600. At the beginning of an irrigation cycle, irrigation calculator 612 calculates an estimate of the amount of water necessary to satisfy the foliage water requirement for each zone at the current day D (using, for instance, Equation (1) above). Irrigation calculator 612 does not activate the irrigation zones as other factors are considered by intelligent water manager 640 that effect the decision to irrigate and the amount of water to allocate to irrigation. Essentially, ET deficits are accumulated over a time period (S/2 is used herein) and corrected for the predominate foliage in the respective irrigation zones on the property using crop factors ($K_i$) (stored in input parameter memory 602) and that amount is adjusted for any rainfall measured during the time period (stored in rainfall bank 620) and irrigation water (as determined by flow manager 630 from readings by the AMR-irrigation system and then stored in irrigation use bank 652). Irrigation use bank 652 should not be confused with irrigation bank 646 (included in bank 644), irrigation use bank 652 stores the amount of irrigation water that has already been delivered to the zones, and irrigation bank 646 stores that amount of water that is available for future irrigation, i.e., water in bank 644 that is not reserved for household use. The rainfall amount should be calculated locally for optimal results using a rain measuring rain sensor, such as that disclosed in Ser. No. 12/150,172 to Bangalore, entitled "Intelligent Rain Sensor for Irrigation Controller" and filed concurrently with the present application. Once the estimated irrigation use for the irrigation cycle is calculated ($\text{EstET}_{7Day}\text{Use}_{irr\text{-}tot}(D)$), it is passed to intelligent water calculator 642 of intelligent water manager 640.

Flow manager 630 receives water use data received from the AMR-irrigation system and conditions it for intelligent water manager 640. Flow manager 630 may communicate directly with the AMR-irrigation system (input port 148 in FIGS. 1A and 2) or may utilize communications controller 609 for wireless communication. Alternatively, if the AMR-irrigation system is coupled to a two-wire irrigation conductor, flow manager 630 may communicate through a two-wire controller with all other two-wire devices on the circuit (not shown). It is expected that the meter reading will consist of a cumulative water usage number that is indiscernible without another reading to compare to. Usage calculator 632 retains at least the previous meter reading from the AMR in order to calculate water usage between readings. Flow calculator 634 computes the average flow rate using the time interval from clock 604 between readings from clock 604. Flow manager 630 may operate under the direct control of intelligent water manager 640, receiving instructions to interrogate the AMR-irrigation system or may operate in a semi-automatic mode by interrogating the AMR at a retrieval frequency set by intelligent water manager 640, for instance one rate during non-irrigation time periods, and faster retrieval frequency during irrigation and a slow rate to conserve the AMR battery if the intelligent water manager 640 senses a low battery condition in the AMR.

Alternatively, either intelligent water manager 640 or flow manager 630 will compare real-time flow rates to historical flow rates for assessing the health of the household and irrigation watering systems. Critical high and low flow/usage factors, as well as abnormal high and low flow/use factors are retained in parameter memory 602 for creating high and low flow and usage thresholds from historical measured values (discussed below with regard to FIG. 10B). If a usage or flow threshold is crossed, alert manager 650 issues a critical alert or abnormal operation warning to the operator. For extreme cases, irrigation valve controller 606 and/or emergency shut-off controller 608 may be instructed to close an appropriate valve to circumvent further water loss or damage.

Intelligent water manager 640 is the central arbiter of the present intelligent water management system. Its primary function is to assess the likelihood that the water can be allocated for irrigation while still having enough water for household water use and not exceeding a predetermined water use cap for billing cycle Cb, UseCap(Cp), before allocating water for irrigation use.

The amount of water in the bank at any day D is determined by comparing the UseCap(Cp) to the MeaUse$_{tot}$(D)

$$\text{Bank}(D) = \text{UseCap}(Cp) - Mea\text{Use}_{tot}(D) \quad (5)$$

where D is the current day in billing cycle Cb;
UseCap(Cp) is the operator-defined upper limit of water usage in billing cycle Cb; and
MeaUse$_{tot}$ is the total amount of water used in the billing cycle at Day D.

Intelligent water manager 640 monitors all water usage from usage data received from flow manager 630 in the billing cycle and debits that amount in water bank 644. Intelligent water manager 640 tracks the measured household water usage for sample period S in historical water usage database 648 in order to estimate the household water use for the remaining R days in the billing cycle. That amount is deducted from bank 644 to determine how much water can be allocated for irrigation use, i.e., irrigation bank 646, while simultaneously meeting the estimated need for household water use during the remainder of the billing cycle. As may be appreciated, some portion of the water in bank 644 is reserved for future household use in billing cycle Cb and the remainder may be allocated to irrigation, i.e., retained as irrigation bank 646. Thus, intelligent water manager 640 must make an estimate of the household water needed for the remainder of the billing cycle (EstUse$_{hom}$(R), where R=Cp−D). The only method of estimating future use is to use a recent historic sample time period as a basis for the estimate. The sample time should be large enough to filter out unimportant fluctuations in the rate, but not so large as to force false warning due to gradient variation of use. For the purposes herein, the sample time, S, is fourteen (14) days. Thus, the historic average home water usage (HisAvgUse$_{hom}$(S)) will be the average $$HisAvgUse_{hom}(S) = \sum_{-(S+1)}^{T=D-1} \frac{MeaUse(T)_{hom}}{S} \quad (6)$$

where D is the current Day;
MeaUse is the daily measured water use; and
S if the sample time.
Then, $$EstUse_{hom}(R) = R \times HisAvgUse_{hom}(S) \quad (7)$$

and $$IrBank(D) = Bank(D) - EstUse_{hom}(R) \quad (8)$$

where IrBank(D) is the amount of the bank not reserved for household use.

It should be mentioned that the sample value S may be too long or short for making certain approximations. For instance, in determining an average flow rate during irrigation of zone i (HisAvgRate(D)$_i$), using S=14 would yield a rather small sample number of zone activations for averaging, perhaps two or four, therefore for many irrigation averages the sample time is 2S.

In other instances, the sample time S may be too long, such as for calculations in which the parametric values for the current billing period are important, but selecting a long sample would force the inclusion of much of another billing cycle, for instance in calculating the amount of water needed to satisfy the foliage water requirement for a zone from the reference evapotranspiration, ET$_0$, e.g., EstET$_{7Day}$Use$_{irr-tot}$(R) discussed immediately below. Simply stated, the water requirements of a crop is cumulative reference evapotranspiration for the sample time adjusted by the crop factor (K), less any rainfall and irrigation amounts during the sample time. Ideally, the foliage water requirement will hover around 0.0 and any positive amount will indicate watering needs that are offset by irrigation. However, because the intent of the present invention is to prioritize water usage, giving precedence to household use, there will be periods when the foliage water requirement is not satisfied by irrigation. As a consequence, the cumulative water foliage water requirement will escalate rapidly. This is especially pronounced at the beginning of a billing cycle where the foliage experienced an irrigation shortfall in the previous billing cycle. Therefore, the sample period for accumulating is set at S/2 or seven days. The result is an accumulation of foliage water requirement for zone i over a rolling seven day sample time period represented by Equation (9) below.

$$EstET_{7Day}Use_{irr-i}(D) = \sum_{-(S/2+1)}^{T=D-1} (ET_0 K_i(T)) - \text{Rain}(T) - MeaUse_{irr-i}(T) \quad (9)$$

where EstET$_{7Day}$Use$_{irr-i}$(D) is the accumulated foliage water requirement in zone i at Day D derived from the most recent seven days;
ET$_0$ is the reference evapotranspiration;
K$_i$ is the crop factor for zone i;
Rain(T) is the rainfall amount in period T;
MeaUse$_{irr-i}$(T) is the measured irrigation use in zone i during time period T;
X represents a 24 hour time period.

An estimate for the total amount of water use for all j irrigation zones that may be employed by intelligent water manager 640 can be represented as follows:

$$EstET_{7Day}Use_{irr-tot}(D) = \sum_{j}^{i=1} EstET_{7Day}Use_{irr-i}(D) \quad (10)$$

where EstET$_{7Day}$Use$_{irr-tot}$(D) is the total accumulated foliage water requirement in the j zones at Day D derived from the most recent seven days.

From which, an estimate for the total amount of water use for all j irrigation zones for the remainder of the billing cycle can be represented as follows:

$$EstET_{7Day}Use_{irr-tot}(R) = EstET_{7Day}Use_{irr-tot}(D)Icb(R) \quad (11)$$

where Icb(R) is the number of scheduled irrigation days in the remaining R days of the billing cycle.

At irrigation time, intelligent water calculator 642 receives an estimate of the amount of water needed for irrigation of this cycle, EstET$_{7Day}$Use$_{irr-tot}$(D), as well as other data necessary for approximating an irrigation water use estimate for the remaining R days in the billing cycle, e.g., EstETUse$_{irr-tot}$(D), EstET$_{7Day}$Use$_{irr-tot}$(D) to estimate MaxEstUse$_{irr-tot}$(R), EstET$_{7Day}$Use$_{irr-tot}$(D) or both). Intelligent water calculator 642 also retrieves priority values for the j irrigation zones PriZon$_i$ for approximating an estimate of priority irrigation water usage for the remainder of the billing cycle, i.e., the remaining R days of the billing cycle. Essentially, intelligent water calculator 642 determines if bank 644 can support both the estimated amount of household water use and the full estimated amount of irrigation water use (based on, for instance, the foliage water requirement), that is can irrigation bank 646 support the estimated irrigation water needs for the remainder of the billing cycle. If irrigation bank 646 contains sufficient water, intelligent water calculator 642 commences the water cycle by signaling irrigation valve controller 606. Irrigation bank 646 may either actuate the j irrigation valves for a predetermined time period or might instead activate each of j irrigation valves until the measured irrigation water for j irrigation zones, MeaUse$_{irr-i}$, meets the foliage water requirements in the respective zone and then deactivates the zone's irrigation valve.

If irrigation bank 646 does not contain enough water to satisfy the complete estimated irrigation water need, intelligent water calculator 642 determines if bank 644 (irrigation bank 646) can support an estimated amount of priority irrigation water usage for the remainder of the billing cycle, along with the estimated water for household needs for the remainder of the billing period. If irrigation bank 646 contains sufficient water, intelligent water calculator 642 commences a priority water cycle by signaling irrigation valve controller 606. If irrigation bank 646 cannot support either amount of water for irrigation, the next irrigation cycle is skipped.

Additionally, intelligent water manager 640 works with flow manager 630 to determine abnormal flow conditions, such as the water flow being too high, too low or critically high or low. If intelligent water manager 640 senses an abnormal flow condition, it takes action appropriate for the condition, e.g., if the measured water flow to an irrigation zone is higher than the historical average for the zone, a warning is sent to the operator, unless it is critically high where the intelligent water manager 640 will immediately deactivate the suspected irrigation zone through irrigation valve controller 606. Intelligent water manager 640 may operate even when the irrigation system is not, and alert the operator of abnormal household water use patterns, such as non-zero water flows in early morning hours (indicating a water leak), or long periods of non-zero water flow, especially after some water use event (indicating a leaky toilet or other appliance). In an extreme case, intelligent water manager 640 may have the authority to activate the master shutoff valve for the billing site (such as a pipe burst event).

Other aspects of the present invention will become apparent for a discussion of the setup and run phases of the intelligent water management controller. In the initial setup phase, the operator sets the maximum amount of water, UseCap(Cp) that is expected to be used over the predetermined time period, Cp, using for instance user interface 546. As discussed, the present intelligent water management system will intelligently adjust the amount of water that is allocated for irrigation in order to meet or exceed the UseCap(Cp), but will attempt to do so in such a way as not to stress the foliage. With a value for the variable UseCap(Cp) set, the operator then sets up the IWMI controller as is well known in the prior art by entering values for the location (ZIP or longitude and latitude), the local time and date, and then selects the watering days and times. These watering days and times may have been designed for the operator's address by the operator's municipality. Finally, the operator selects a watering cycle "TimePer" for calculating the water usage amounts, for instance, weekly, monthly (every 30 days) or by calendar month (which water billing cycle (Cb) is usually taken from).

Continuing in the initial setup phase, the operator examines each physical irrigation zone to determine the type of foliage or turf being irrigated and may estimate the surface area for each zone (although this may not always be necessary for the watering calculations). For example, from Table I it can be appreciated that zone 1 irrigates a front lawn having a surface area of 1108 ft$^2$ that is located in the front of the operator's home. Zone 4 irrigates a flower bed in which tropical type plants are arranged with 817 ft$^2$. Therefore, at the IWMI controller interface the operator enters "1108" for the area of zone 1 and "817" for the area of zone 4, and so on. In order to determine the amount of water needed to satisfy the foliage water requirement of each zone, the controller utilizes a crop factor or coefficient (K$_i$) with the reference evapotranspiration (ET$_0$), as discussed immediately above with regard to Equations (8). A value for K$_i$ may be manually entered if the operators knows its value, or instead the operator may select the type of foliage or turf in the zone from an onscreen menu and the controller for determining a crop factor value for the foliage selection. Here, it should be mentioned that the crop coefficient is not always a static value, for many crops the crop coefficient changes seasonally. Advanced irrigation controllers may account for these changes.

TABLE I

| Variable | Zone | | | | | |
| --- | --- | --- | --- | --- | --- | --- |
| | 1 | 2 | 3 | 4 | 5 | 6 |
| Description | Frnt Lawn | Side Lawn | Frnt Garden | Bck Garden | Bck Lawn | Side Lawn |
| Foliage | Bermuda | Bermuda | Cactus | Tropical | Bermuda | Bermuda |
| ZonAr | 1108 | 701 | 681 | 817 | 948 | 834 |
| Crop Factor (K) | 1.00 | 1.00 | 0.80 | 1.30 | 1.00 | 1.00 |
| Maintenance | 50.00 | 50.00 | 20.00 | 90.00 | 50.00 | 50.00 |
| ZonPri | 80.00 | 50.00 | 30.00 | 90.00 | 50.00 | 80.00 |

The aim here is to meet or exceed the UseCap(Cp) watering constraint, with as little impact on the operator's turf/foliage as possible. If the amount of water allocated to irrigation is less than ideal, there must be a priori to determine how to make adjustments in the amount of irrigation water. This is achieved by assigning a priority for the amount of water targeted to each irrigation zone. The priority value for a zone (PriZon$_i$) is the weighted importance of the zone to the operator, but considering the type of foliage present in the particular zone. For instance, Bermuda grass may require a certain amount of water per week for optimal growth and aesthetic beauty, for example 1.0 inch of water per week in the summer months. That type of grass will survive on half that amount and look relatively well on 80% of the optimal amount.

Therefore, the operator may select a priority value of 80% for the front lawn and 50% for the back lawn that is out of sight from passersby. These priority settings, if implemented by the irrigation controller, will provide enough irrigation water to the front turf to maintain a relatively good appearance, but only allocate enough irrigation water to the back yard turf to keep it alive. If the controller reverts to priority irrigation watering over any appreciable time period, most probably the back yard turf will go dormant and may discolor, but the root systems will survive.

Thus, the operator assigns a priority value for each of the j irrigation zones. For example, considering the tropical plants in the front bed in zone 4 is located in view of passersby of the operator's home, the operator will probably assign a relatively high priority for the zone. From the foliage type selected by the operator, the IWMI controller assesses a maintenance factor for the foliage type in each zone. The maintenance factor is a minimum percentage of the foliage water requirement that will keep it alive. Here, the operator has assigned a priority of 90% for zone 4. The controller compares the 90% value to the 90% maintenance value for tropical plants and passes the operator's selection. If the operator had selected a $ZonPri_4$ of 80%, the IWMI controller will recognize that the 80% priority value will not provide a sufficient amount of water to keep the plants in zone 4 alive and will warn the operator that the priority value is too low for the zone. The operator can then adjust the priority value to ensure the survival of the plants in that particular zone. For the case of the Bermuda turf, the IWMI controller understands that this type of turf can survive, although not flourish, at 50% of its watering requirement. Therefore, the operator can select a value of ZonPri of 50% without permanently damaging the turf. While a ZonPri value of 50% may be in side and back (rear) lawn of zones 2 and 5 which are out of sight of passersby, it is less than optimal for the other side lawn and the front lawn which are in full view of the neighborhood. Therefore, a higher ZonPri value is selected for zones 1 and 6.

An estimate for the total amount of water use for all j irrigation zones using priority irrigation watering can be represented as follows:

$$EstPriET_{7Day}Use_{irr-i}(D) = \sum_{-S/2}^{T=D} (ET_0 K_i ZonPri_i(T)) - \text{Rain}(T) - MeaUse_{irr-i}(T) \quad (12)$$

where $EstPriET_{7Day}Use_{irr-i}(D)$ is the accumulated foliage maintenance water requirement in zone i at Day D derived from the most recent seven days;

$ET_0$ is the reference evapotranspiration;

$ZonPri_i$ is the operator defined priority value for zone i;

$K_i$ is the crop factor for zone i;

Rain(X) is the rainfall amount in period X;

$MeaUse_{irr-i}(X)$ is the measured irrigation use in zone i during time period X;

X represents a 24 hour time period.

Below is an estimate for the total amount of priority irrigation water usage for all j irrigation zones can be represented as follows:

$$EstPriET_{7Day}Use_{irr-tot}(D) = \sum_{j}^{i=1} EstPriET_{7Day}Use_{irr-i}(D) \quad (13)$$

And an estimate for the total amount of priority irrigation water usage for all j irrigation zones during the remaining R day of the billing cycle can be represented as follows:

$$EstET_{7Day}Use_{irr-tot}(R) = EstET_{7Day}Use_{irr-tot}(D)Icb(R) \quad (14)$$

Finally, a series of parametric values are selected for assessing the health of the water systems. Typically, these parametric values are used in conjunction with a historical measure water flow rate or usage and that is compared to a real-time, or temporal measurement. The comparison provides a health indication. Table II below is a non-exhaustive list of the possible parametric values and how each would be used for assessing the health of irrigation zone i.

TABLE II

| Description | Sym | Action | Default |
|---|---|---|---|
| Abnormal High | H | H × $HistAveUse_{irr-i}$ < $MeaUse_{irr-i}$ < M × $HistAveUse_{irr-i}$ | 1.15 |
| Critical High | M | M × $HistUse_{irr-i}$ < $MeaUse_{irr-i}$ | 1.30 |
| Abnormal Low | L | L × $HistAveUse_{irr-i}$ > $MeaUse_{irr-i}$ > L × $HistAveUse_{irr-i}$ | 0.85 |
| Critical Low | Q | Q × $HistUse_{irr-i}$ > $MeaUse_{irr-i}$ | 0.75 |

It should also be mentioned that if the controller senses a critical condition, it may take some autonomous action, such as deactivating the irrigation zone or issuing a critical alert over a separate communication medium, e.g. an audible alarm or text or emailing a message. Importantly, the present IWMI controller may also detect and act on water system health issues other than the irrigation system, for instance, the controller may detect a catastrophic pipe break by comparing the measured use to the product of a historical high flow rate and a critical high parametric value (e.g., M×MaxHistFlow).

Finally, during the initial setup phase the operator may input an AMR identifier, encryption key, password or other information for communicating with and decoding messages from the AMR or from the AMR-irrigation system. It is expected that municipal water utilities will grant partial access to capabilities resident on the AMI-AMR system on the property. For instance, the operator will be authorized to interrogate the AMI-AMR for usage/flow information, but not to reset flow information or override the utility's shutoff commands.

The run phase of the intelligent water manage controller can best be understood through a discussion of the methods employed by the controller depicted in FIGS. 7-10 as flowcharts.

Figure 7:
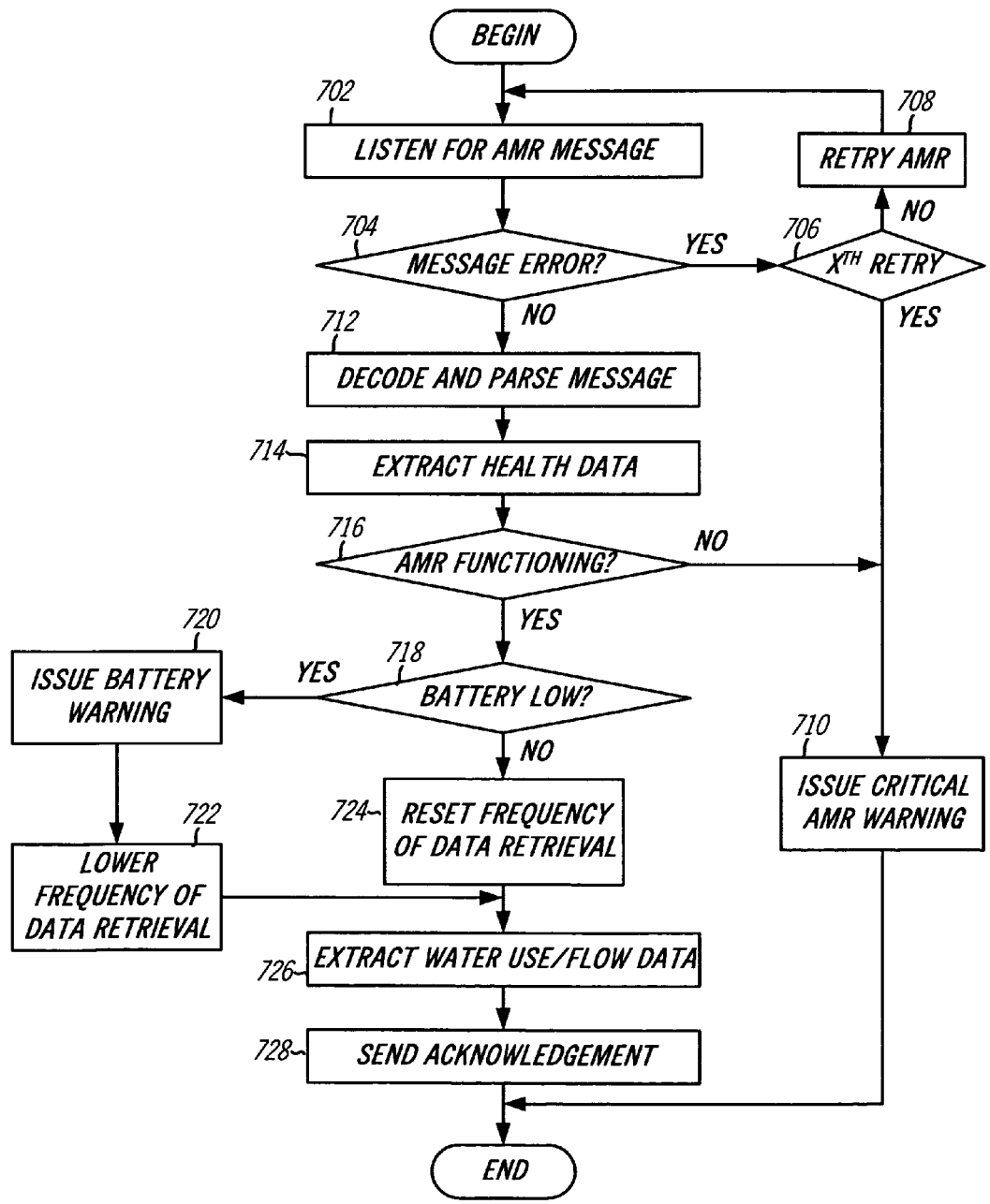
FIG. 7 is a flowchart depicting a method for communicating with an AMR-irrigation system in accordance with an exemplary embodiment of the present invention.

FIG. 7 is a flowchart depicting a method for communicating with an AMR-irrigation system in accordance with an exemplary embodiment of the present invention. Recall that the present controller may communicate with the AMR-irrigation system over a wire or wireless medium, or over the irrigation systems native two-wire network and then the AMR-irrigation system may have some amount of intelligence. In any case, the present intelligent water management controller "listens" for a communication from the AMR-irrigation device (step 702). This may be in response to a query issued to the AMR-irrigation device by the IWMI controller, or if the AMR-irrigation device has the intelligence for autonomous actions, it may instead be an uninitiated message. In either case, the IWMI controller inspects the message format, structure, parity and encoding for compatibility (step 704). If the message appears to be corrupt, undecipherable or if the IWMI simply does not receive a response message within a predetermined timeframe, the IWMI makes a series of X retries (step 708) to communicate with the AMR irrigation device. After the $X^{th}$ unsuccessful attempt (step 706), the IWMI issues a critical error warning to the operator concerning communication with the AMR (step 710).

If the IWMI controller can decipher the message, it will decode the message using the AMR ID and password entered by the operator and parses the message into its parts (step 712). Next, if the message contains health information about the AMR device, the IWMI controller will extract it (step 714) and determine if that data can be relied on (step 714). If the data are compromised, the IWMI issues a critical error warning to the operator concerning communication with the AMR (step 710). The AMR is functioning and the message contains AMR battery health information, that data are checked (step 718); if the battery is low, a warning is sent to the operator (step 720) and the IWMI controller will decrease the frequency it interrogates the AMR device (for instance from once every minute during irrigation zone to once at activation commencement and another at deactivation). If the battery level is acceptable, the controller resets the interrogation frequency comparable for the current operation (step 724). Finally, the water use and/or flow rate data are extracted from the message (step 726) and an optional acknowledgment message is sent (step 728). The process then ends.

The water management aspects of the present IWMI controller will now be described, beginning with a high level discussion of the intelligent water management process. FIG. 8 is a flowchart depicting a method for intelligent water management in accordance with an exemplary embodiment of the present invention. The process begins by calculating the current bank amount as discussed with regard to Equation (5) above (step 802). Next, the controller estimates the household water usage for the remainder of the time period (i.e., the remaining R days of the billing cycle) by using historical household water use data as shown in Equation (7) (step 804). A determination is made as to whether the bank can support the estimated household water usage for the remainder of the billing cycle (R), i.e., if $Bank(D) > EstUse_{hom}(R)$ (step 806). If the bank amount is too low, the routine will not enter the irrigation cycle phase (whether or not one is needed or scheduled). Instead, the IWMI controller issues a warning to the operator that use cap may be exceeded if the rate of household water consumption continues unabated and the process then terminates (step 808). Thus, one advantage of the present IWMI controller is that it will alert the operator if it projects that the household water consumption will exceed the predetermined water usage cap amount. If the bank will support the estimated household water usage, the process continues into the irrigation phase.

First, a check is made to determine if the current day D is an irrigation day (step 810). If not, the process ends. If day D is an irrigation day, the controller must then determine if the bank will support irrigation and if so, the usage level that the bank can support. In order to determine how much water is needed for irrigation, the controller estimates the foliage water requirement (step 812). One method of estimating the foliage water requirement is through the use of a reference evapotranspiration value, which is corrected for crop type, and then offset for rain and irrigation amounts. Some water runoff may occur, so the rain (and irrigation) offset may be adjusted for soil conditions (slope, percolation, etc.) (see Equation (9) above). If the controller does not support evapotranspiration calculations or the like, the foliage water requirement can be assumed to be the measured irrigation water use at the manual settings (it is presumed that the manual watering times set by the operator provide the optimum amount of water needed for the foliage). Similarly, the foliage water requirement may also be estimated by using root zone moisture measurements instead of from evapotranspiration values. Next, the controller verifies that the bank can support the estimated irrigation water usage ($EstET_{7Day}Use_{irr-i}(R)$) along with the estimated household water usage ($EstUse_{hom}(R)$) for the remainder of the billing cycle, i.e., for example, if $Bank(D) > EstET_{7Day}Use_{irr-i}(R) + EstUse_{hom}(R)$ (step 814). If the bank amount is sufficient, irrigation proceeds (step 816) and the process ends. If the bank amount is insufficient to satisfy the complete foliage water requirement, the process estimates priority irrigation water usage based on the priority water needs of the foliage for the remaining days R of the billing cycle (Equation (14)) (step 818) and verifies that the bank can support the estimated priority irrigation water usage (Equation (14) above) along with the estimated household usage ($EstUse_{hom}(D)$) (Equation (7) above) for the remainder of the billing cycle, i.e., for example, if $Bank(D) > EstPriET_{7Day}Use_{irr-i}(R) + EstUse_{hom}(R)$ (step 820). If the bank will support both amounts, the controller allocates enough water for priority irrigation (step 822). If not, the current watering cycle is skipped and the controller issues a water use warning to the operator indicating that the water cycle was skipped. The process then ends.

In accordance with a variation for the above described process, recall that the controller may calculate maintenance values for each irrigation zone. In most cases the priority irrigation watering amount exceeds the maintenance foliage watering amount, and will have a greater impact on the bank than the maintenance watering amount. Therefore, in a further attempt to maintain the UseCap(Cp) watering constraint without permanently damaging the landscape of the property, after failing the verification in step 820, the IWMI controller estimates the maintenance water requirement of the landscape on the property and verifies that the bank can support the estimated household use and the maintenance water requirement of the landscape. If so, the IWMI controller allocates enough water for maintenance irrigation. If it will not support the maintenance irrigation, the current watering cycle is skipped and the controller issues a water use warning to the operator indicating that the water cycle was skipped.

Figure 9A:
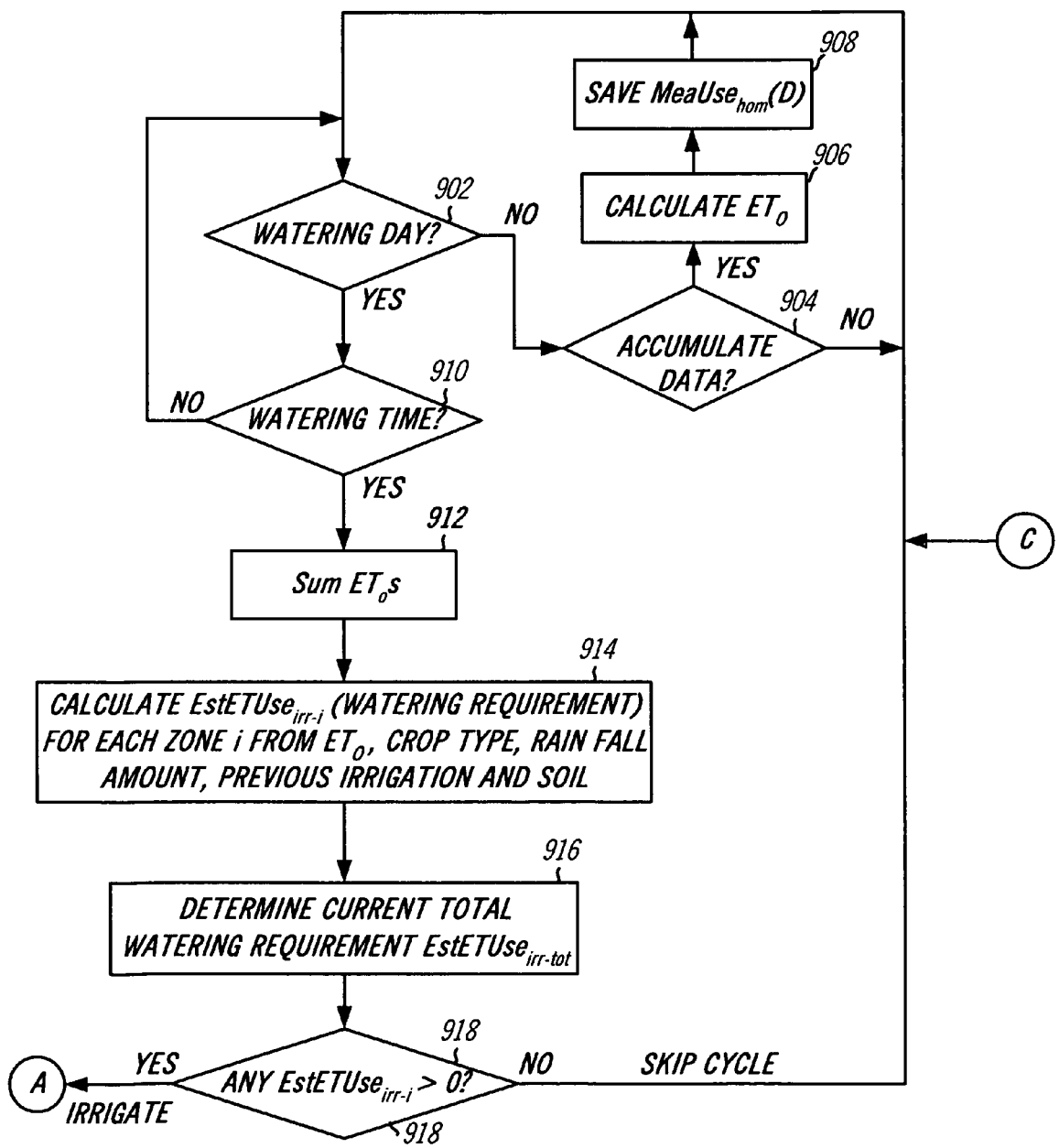
FIG. 9A-C is a flowchart showing a more comprehensive method of intelligent water management in accordance with another exemplary embodiment of the present invention.
Figure 9B:
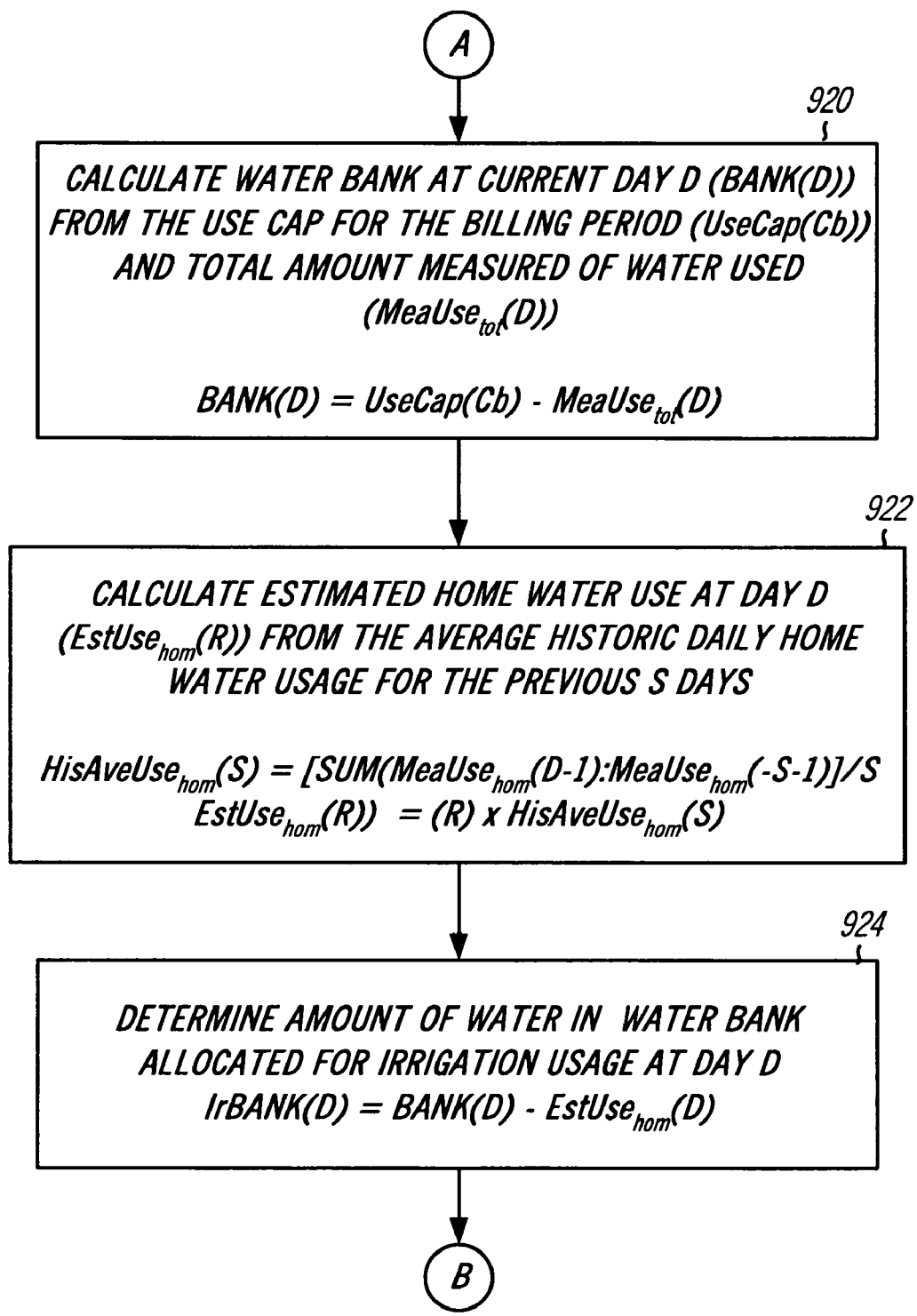
Figure 9C:
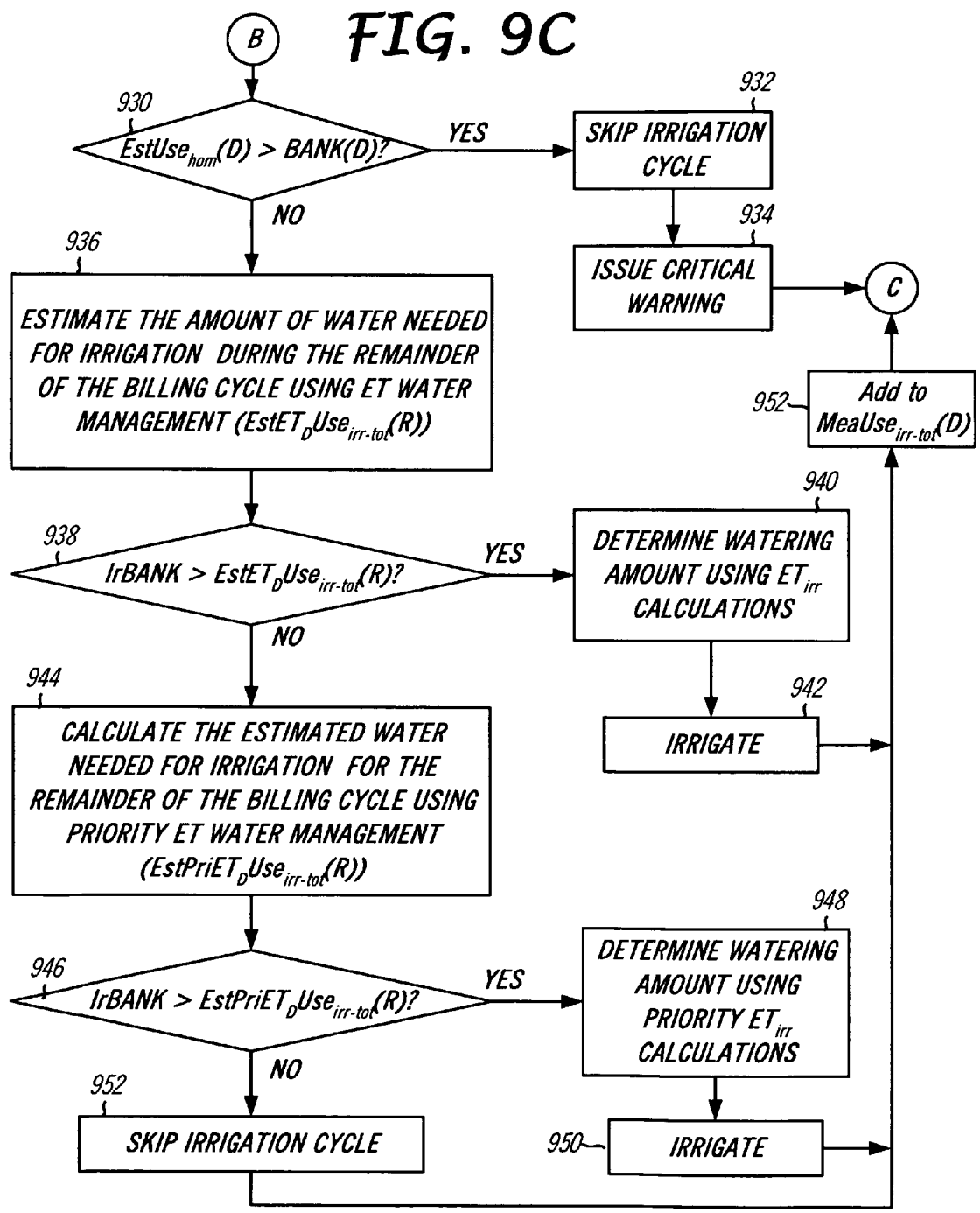

FIG. 9A-C is a flowchart showing a more comprehensive method of intelligent water management in accordance with another exemplary embodiment of the present invention. The process continually iterates in an ongoing cycle, but at each iteration a determination is made whether the current day is a watering day (step 902), if not the time is checked against the accumulation time where the day's readings are accumulated and calculations are made, such as midnight (step 904). If it is accumulation time, the process calculates the reference evapotranspiration ($ET_0$) (or it may receive from a weather station or the like) (step 906) and the measured water usage for the day is saved (step 908). If at step 902, it is determined to be an irrigation day, the time is checked for the watering time (step 910) and then the reference evapotranspiration ($ET_0s$) are summed over some accumulation time period to determine the ET deficit for the time period (the selection of an accumulation time is discussed above). Using ET deficit, the water requirement for each irrigation zone can then be estimated by adjusting the ET deficit (accumulated reference evapotranspiration values) for the crop type ($K_t$) in the zone and offsetting that amount with any rainfall or irrigation water received by the zone during the same time period (step 914). Prior to offsetting the ET deficit, the rainfall amount may be corrected for runoff due to average slope of the irrigation zone and/or a percolation value for the soil in the irrigation zone prior to offsetting. Since the purpose of irrigation is to replenish any water deficit of the foliage, the estimated water use for at least one irrigation zone must be non-negative (EstETUse$_{irr-i}$>0) (step 918), or else the irrigation cycle is skipped.

If irrigation is necessary, the process calculates the amount of water currently available in the bank (Equation (5)) (step 920), estimates the amount of water that will be needed for household use for the remaining R days in the billing cycle based on historical home water usage (Equation (7) derived from Equation (6)) (step 922) and then the amount of water in the bank may be allocated for irrigation use i.e., the amount of water available in the irrigation bank (Equation (8)) (step 924). The process cannot proceed, that is an irrigation cycle cannot be activated, unless the amount of water in the bank at least exceeds the estimated household water use for the remaining R days of the billing cycle, which is tested (step 930). If the water in the bank cannot meet the estimated household water need, the irrigation cycle is skipped (step 932) and a critical warning is issued to the operator indicating that if the household water use continues at its current rate, the UseCap will be exceeded (step 934).

Returning to step 930, if the amount of water in the bank exceeds the estimated household water need, the process estimates how much water will be required to satisfy the estimated water requirement of the landscape for the remaining R days of the billing cycle (Equation (11)) (step 936). That amount is compared to the amount of water in the bank that can be allocated for irrigation, i.e., the irrigation bank (for example, if IrBank>EstET$_{7Day}$Use$_{irr-tot}$(R)) (step 938). If day D is later in the billing cycle (for instance if D>R), the irrigation usage estimate should be rather pessimistic and not assume any rainfall, such as by using Equation (3). For example, after if day D=R, then IrBank>MaxEstUse$_{irr-tot}$(R) for activating the preset day D irrigation cycle at a watering level that would satisfy the complete need of the landscape, e.g., providing an amount of irrigation water equivalent to EstET$_{7Day}$Use$_{irr-tot}$(R). If the amount of water in the irrigation bank is sufficient, the amount of irrigation water is calculated to meet the present day D needs of the landscape such as using Equation (10) above that includes offsets for rainfall and irrigation (step 940) and irrigation commences (step 942).

If, at step 938, it is determined that the irrigation bank cannot support both the estimated amounts of household and irrigation water usages for the remaining R days of the billing cycle (using the appropriate water calculation), the IWMI controller estimates the amount of water needed for priority irrigation watering for the remaining R day of the billing cycle (such as by using Equation (14)) (step 944). Here again, an overly optimistic priority irrigation water use estimate can result in a scheduled irrigation cycle to be skipped later in the billing period. At any irrigation cycle, the IWMI controller has three options: provide enough water to satisfy the complete foliage water requirement, provide only the priority water needs of the foliage or skip the irrigation cycle. It is always a better option to allocate enough water for a priority irrigation watering than to skip the irrigation cycle altogether. Therefore, while a more pessimistic water usage estimate should be employed for determining whether to irrigate the full amount of foliage water requirement, a better alternative for determining whether or not to water at the priority watering level is to use the more optimistic irrigation water usage estimate for determining if priority watering should proceed. In any case, if the bank can support both the estimated amount of household water usage and the estimated amount of priority irrigation water usage, the IWMI controller determines the amount of water to allocate for the present day D water cycle using, for example, Equation (13) above, (step 948) and irrigation proceeds (step 950). If at step 946, it is determined that the bank cannot support both the estimated amount of household water usage and the estimated amount of priority irrigation water usage for the remaining R days of the billing cycle, the irrigation cycle at day D is skipped (step 952).

Skipping an irrigation cycle is a drastic measure that may have a detrimental impact on the landscape and, therefore, should be implemented only as a last resort to ensure sufficient water for household usage. An especially critical period for the IWMI controller's decision making is at the end of one billing cycle and the beginning of the subsequent cycle. As discussed above, the initial few estimations of household and irrigation usage for a new billing period are highly speculative because the measured household water use and rainfall for the billing cycle cannot be known with any degree of certainty. These estimates may be pessimistic and may be even more pessimistic with a high ET deficient from the previous billing cycle. It is, therefore, important to keep the ET deficient as low as possible between billing cycles. Therefore, in accordance with still another exemplary embodiment of the present invention, the last irrigation cycle should never be skipped completely. Instead, whatever amount of water that remains in the irrigation bank should be divided between the irrigation zones proportionally with their priority values. For example, if the irrigation bank contains only half the water necessary for the remaining cycle of priority irrigation water usage, then the individual irrigation zone should be allocated half of their respective priority irrigation water usage amounts. In so doing, the ET deficient that is carried over between billing cycles is somewhat reduced, resulting in more accurate and more optimist irrigation usage estimations.

In another aspect of the present invention, the IWMI controller monitors the irrigation and household plumbing system's present health, analyzes water flow and usage rates for inconsistencies with historical use patterns and issues operator warnings based on the outcome of those comparisons. The IWMI controller may also take autonomous action in critical citations. These and other aspects of the present invention will be best understood by reference to the following detailed description of an illustrative embodiment when read in conjunction with the flowchart in FIGS. 10A and 10B.

Figure 11B:
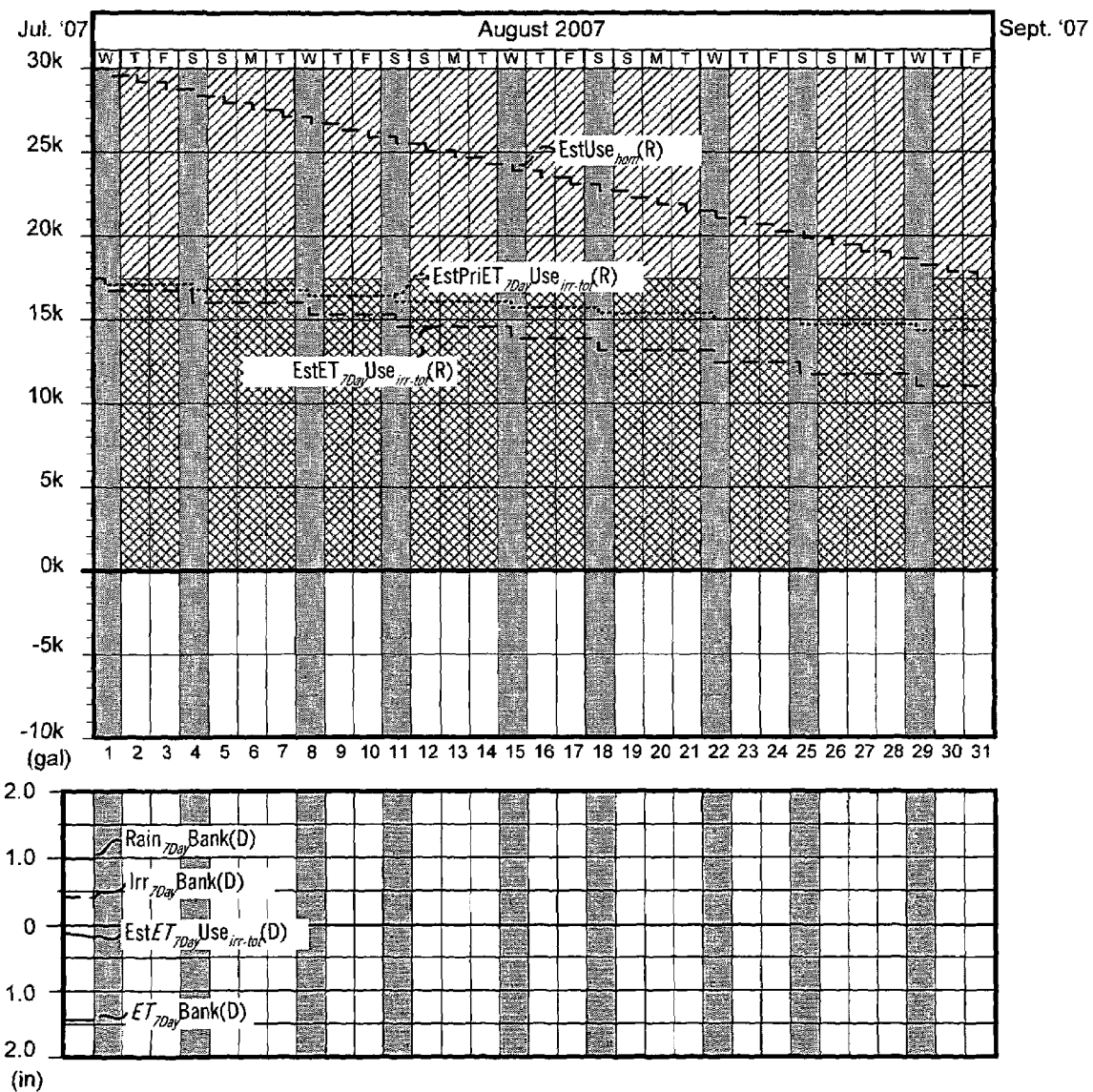

FIGS. 11A through 11H diagrammatically depict water usage results for an IWMI controller implementing the method of intelligent water management of FIGS. 9A-9C on days 1, 8, 15, 22, 29 and 30 of the billing cycle in accordance with another exemplary embodiment of the present invention. FIG. 11A shows the entire billing cycle as forecast from day 1, with a use cap of 30,000 gallons. Irrigation days are preset as days 1, 4, 8, 11, 15, 18, 22, 25 and 29. The IWMI controller must first estimate the household water usage for the billing period (EstUSt$_{hom}$(R) from Equation (7)). EstUSt$_{hom}$(R) is the amount of water in the bank that is reserved for household use and extends from the UseCap of 30 k-gals. The water not needed for household use can be allocated for irrigation use, thus the lower level of EstUst$_{hom}$(R) defines the amount of water in the irrigation bank. Each irrigation day, EstUst$_{hom}$(R) and added to the measured home water use MeaUse$_{hom}$(D) to redefine the amount of water in the irrigation bank. The more water that is used in the household, the less that is available for irrigation during the remainder of the billing cycle. Furthermore, an increase in the amount of water used for the household will also cause the estimated household water usage to increase, further decreasing the amount of water available for irrigation.

The amount of water necessary for the landscape is now estimated. The water estimates are depicted using both $EstET_{7Day}Use_{irr-tot}(R)$ and $EstET_DUse_{irr-tot}(R)$ (where $ET_D$ is a water estimate using a relatively pessimistic calculation, such as $ET_D=ET_0(D) \times R$). Notice that the $EstET_DUse_{irr-tot}(R)$ is extremely pessimistic and its use would require the IWMI controller to implement priority watering on day 1. By using $EstET_{7Day}Use_{irr-tot}(R)$, on the other hand, the IWMI controller can allocate the full amount of water required by the landscape.

FIG. 11B shows the entire billing cycle as forecasted from day 1 in the upper track and the daily values for the 7 day bank amounts ($Irr_{7Day}Bank(D)$, $ET_{7Day}Bank(D)$, $Rain_{7Day}Bank(D)$), the estimated water requirement of the landscape $EstET_{7Day}Use_{irr-tot}(D)$ from the sum of the water in the 7 day banks, and the irrigation amount on irrigation day $Irr(D)$ which is derived from the amount in the $Bank(D)$ that can be allocated to irrigation $IrBank(D)$ on day D. The aim of irrigating is to compensate ET deficit (as estimated by $EstET_{7Day}Use_{irr-tot}(D)$) as much as possible thereby replenishing the value of $EstET_{7Day}Use_{irr-tot}(D)$ to near zero.

Figure 11C:
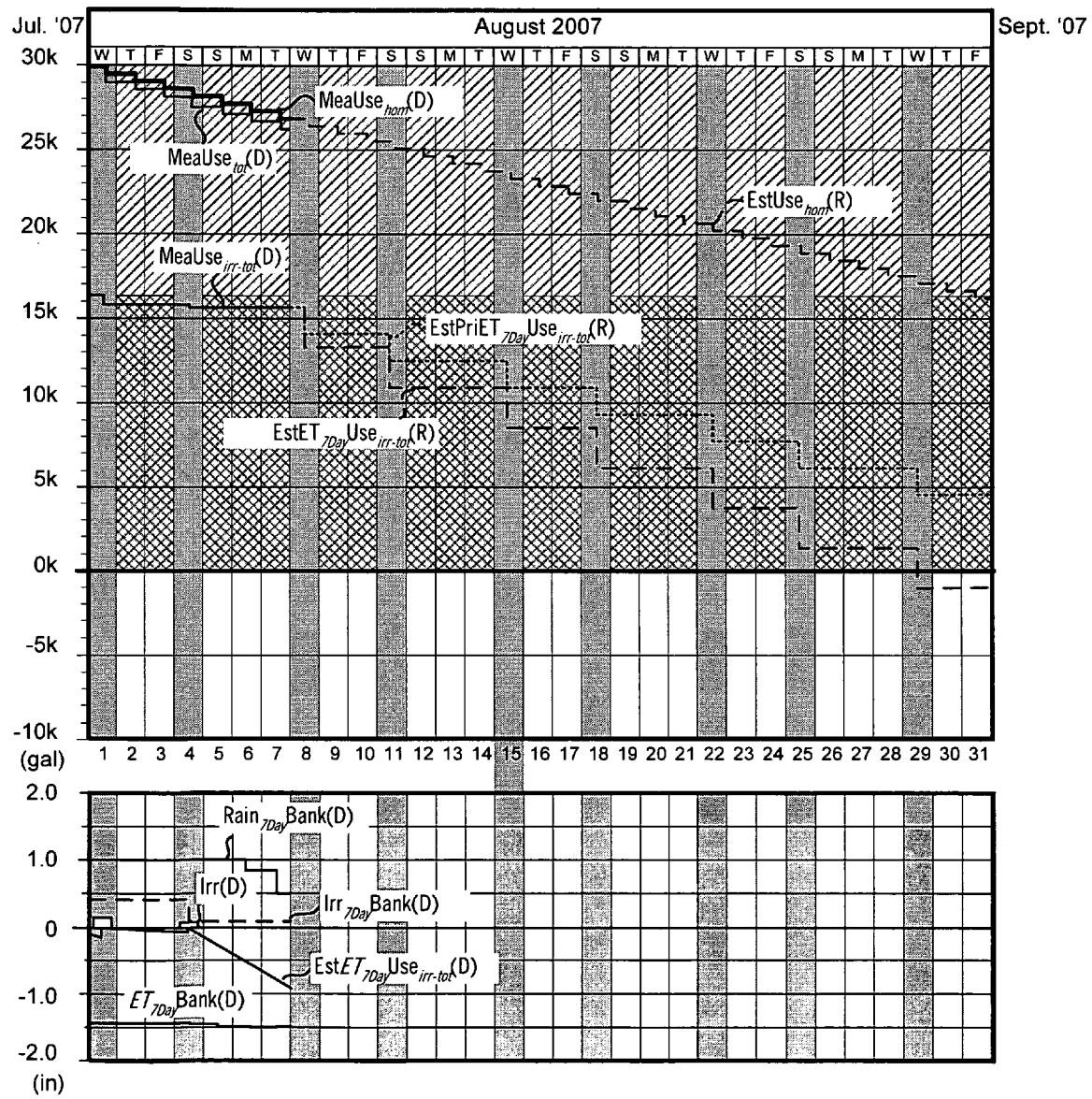

FIG. 11C shows the forecast at day 8. Here it can be appreciated that on irrigation days 1 and 4, almost the entire ET deficit was offset by rain and therefore very little irrigation was required on those days. On day 8 however, the ET deficit is much higher and because the $EstET_{7Day}Use_{irr-tot}(R)$ curve drops below zero, it can be appreciated that the bank cannot support the estimated household water usage and the estimated water requirement of the landscape. From the $EstPriET_{7Day}Use_{irr-tot}(R)$ curve, it can be appreciated that the IWMI controller can allocate the priority irrigation water amount without interfering with the estimated household water usage. Therefore, irrigation watering will proceed at the priority irrigation water usage amount on day 8.

Figure 11D:
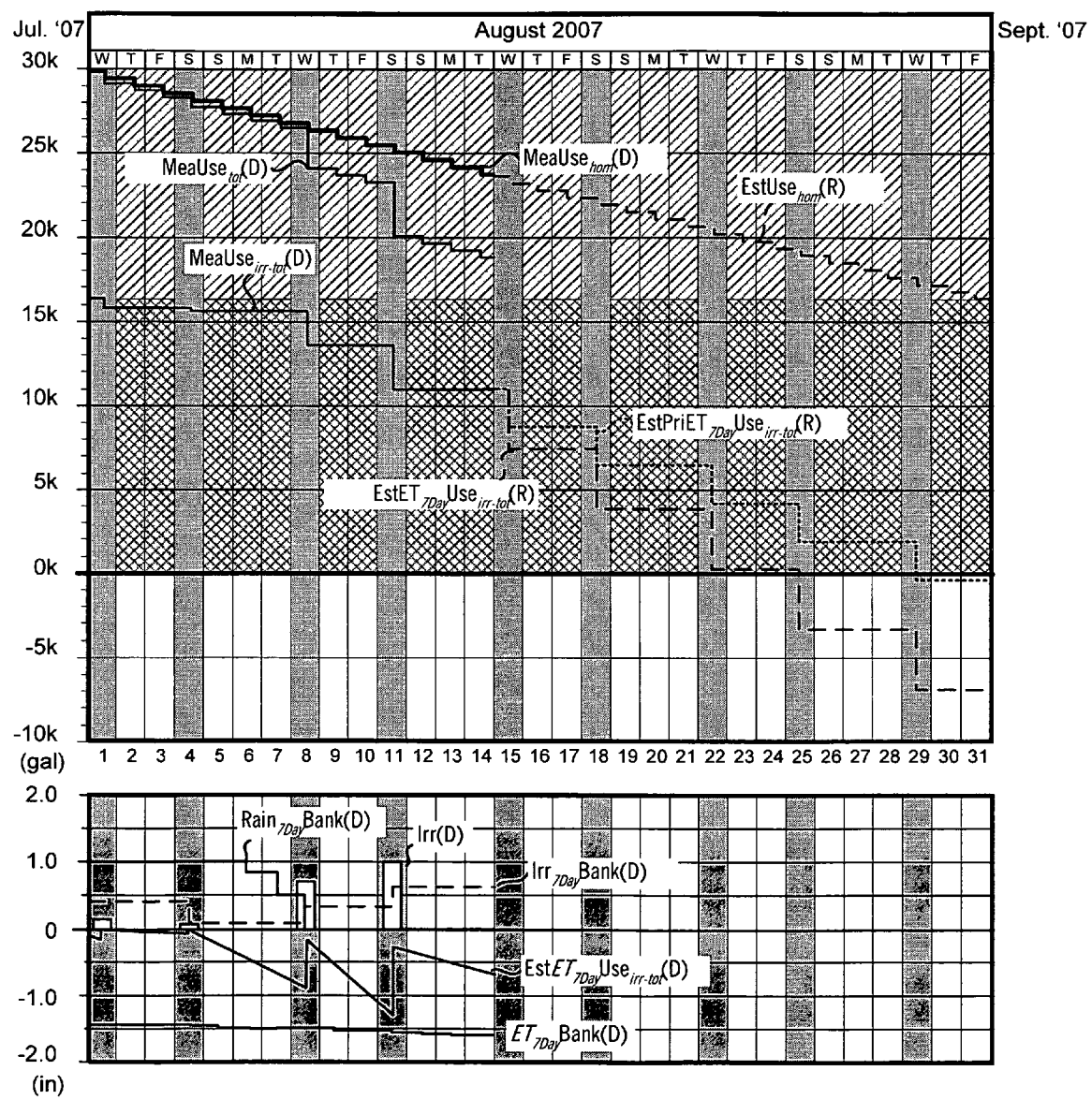

FIG. 11D shows the forecast at day 15. Notice that on irrigation days 8 and 11, that the ET deficit ($EstET_{7Day}Use_{irr-tot}(D)$) could not be totally offset by irrigation since the bank could only support priority irrigation watering. On day 15, the $EstET_{7Day}Use_{irr-tot}(R)$ and $EstPriET_{7Day}Use_{irr-tot}(R)$ curves both drops below zero, indicating that the bank cannot support both the estimated household water usage and any irrigation for the remaining R days of the billing period, even irrigating at the priority irrigation water usage amount. Therefore, the entire irrigation cycle is skipped on day 15.

Figure 11F:
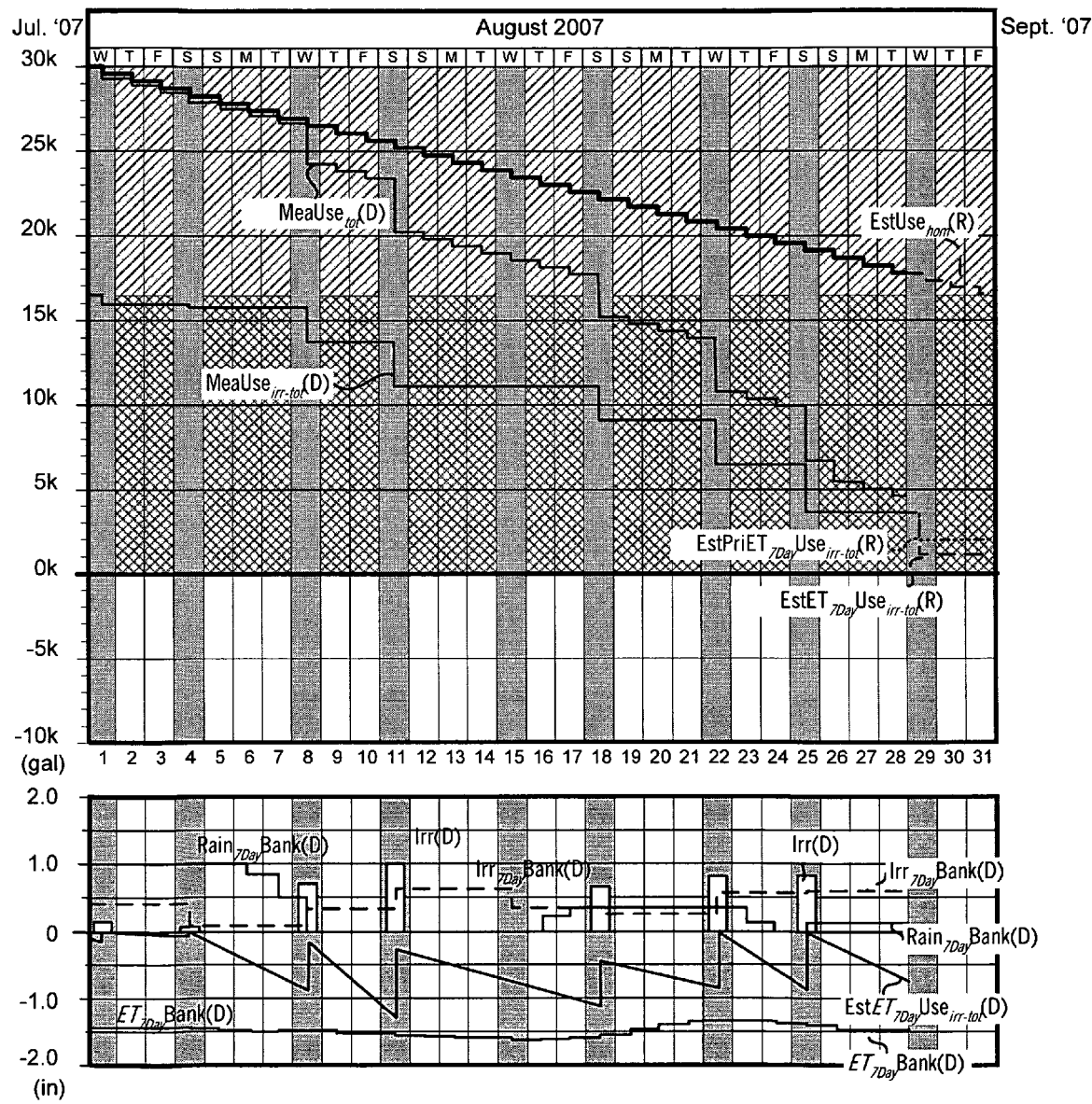

FIG. 11E shows the forecast at day 22. Notice here that because the ET deficits are accumulating over a seven day rolling time period, they rarely exceed −1.7 inches, even without rainfall or irrigation offsets (see day 15-17). This diagrammatically illustrates the mechanism for constraining the ET deficit at a level which allows for accurately estimating the foliage water requirement for the remainder of the billing period. Notice that the $EstET_{7Day}Use_{irr-tot}(R)$ curve remains above zero, so the IWMI controller can allocate the full amount of irrigation to satisfy foliage water requirement. FIG. 11F shows the forecast day 29 and that here again the bank can support the estimated household usage and estimated irrigation needs for the remainder of the billing cycle.

Figure 11G:
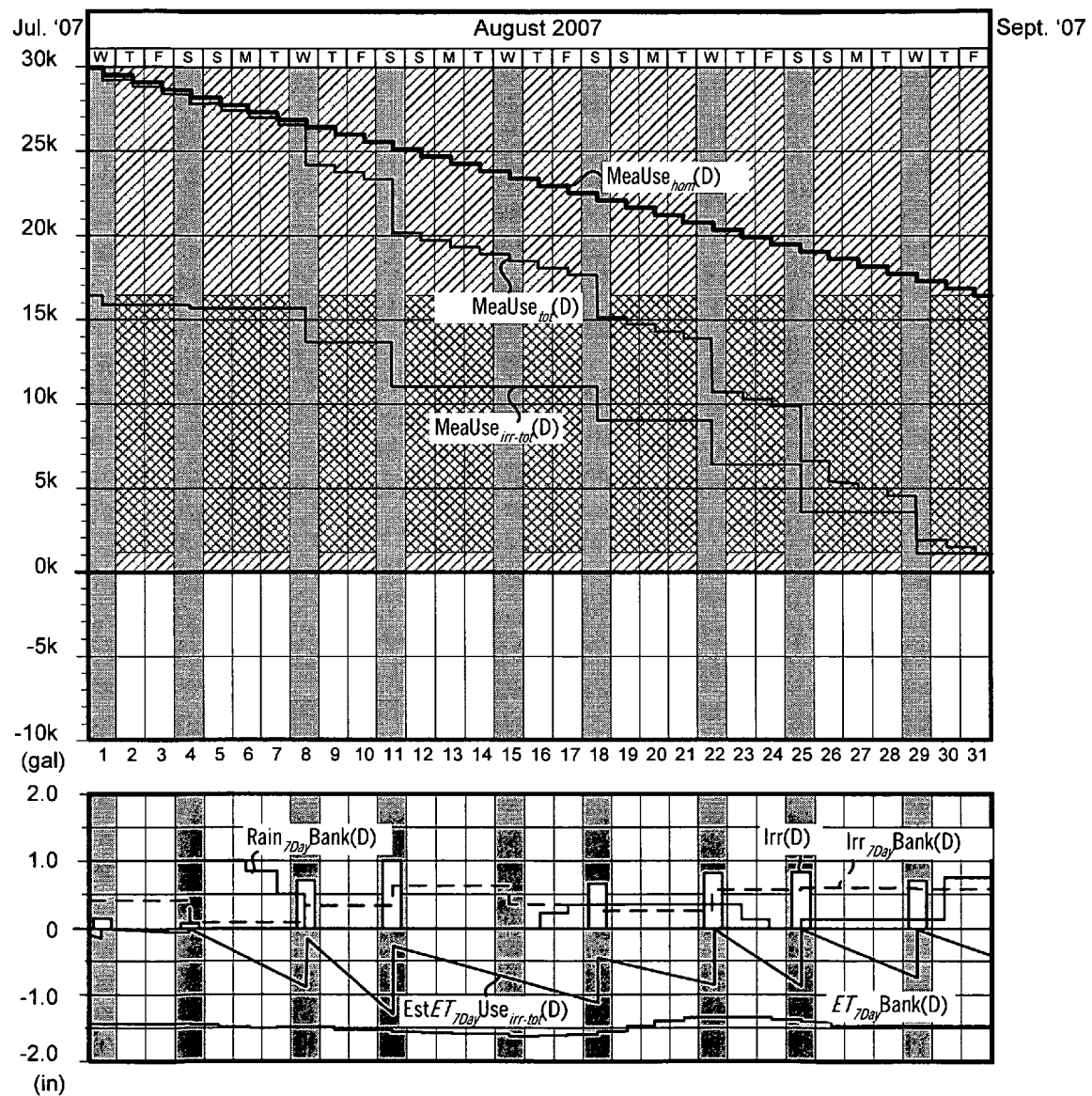

FIG. 11G shows the record of water usage at day 30. The goal is to allocate only enough water for irrigation that will keep the total water usage for the billing site within the 30 k-gal UseCap. Approximately 900 gallons of water remains in the bank, so the objective was achieved. The foliage water requirement was satisfied by irrigation on five irrigation days, on two other days the foliage received the priority irrigation water amount and one day was skipped.

Figure 11H:
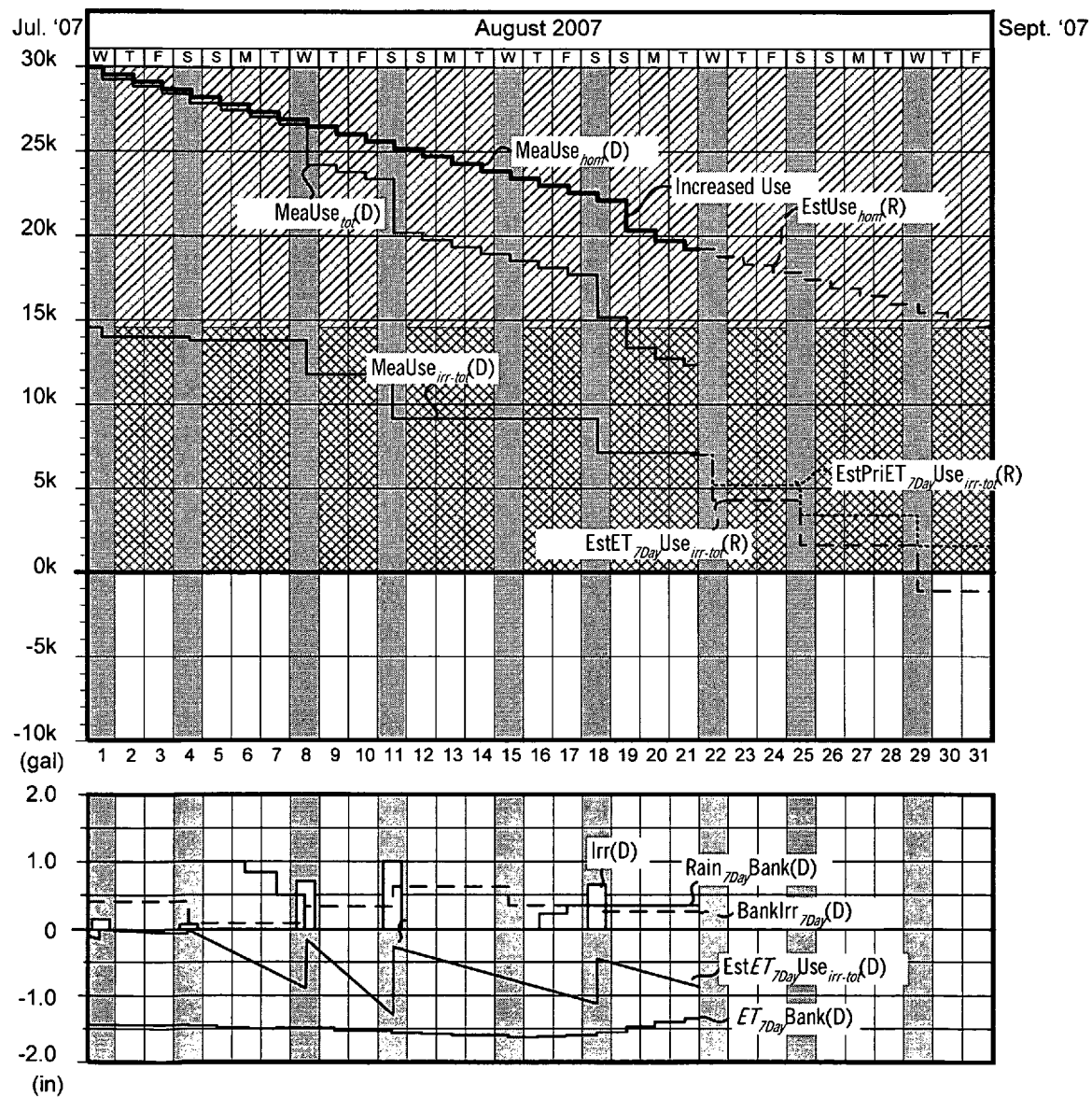

Turning to FIG. 11H, here the forecast at day 22 is shown as in FIG. 11E, but here the household uses an unexpectedly large amount of water on day 19. This results in less water being available for irrigation and hence the $EstET_{7Day}Use_{irr-tot}(R)$ curve drops below zero; $EstPriET_{7Day}Use_{irr-tot}(R)$ remains positive. Since irrigation watering cannot proceed at the full water amount required by the foliage, it must proceed at the priority irrigation level in order to retain enough water in the bank to support both the future household water consumption and to allocate some water each cycle for irrigation.

Figure 10A:
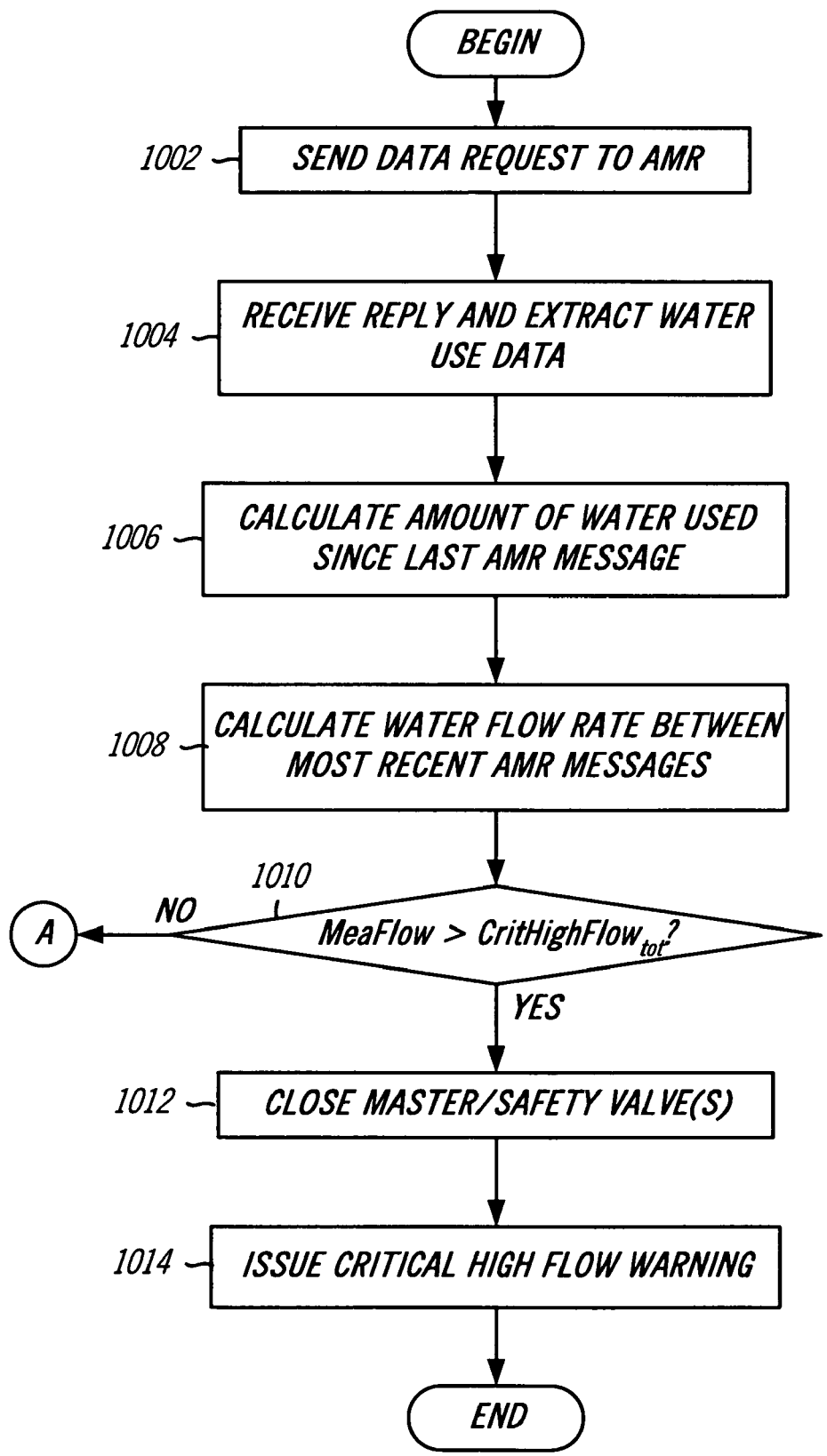
FIGS. 10A and 10B is a flowchart depicting a method for monitoring the health of irrigation and household plumbing system and an AMR device using an AMR-irrigation system in accordance with an exemplary embodiment of the present invention.
Figure 10B:
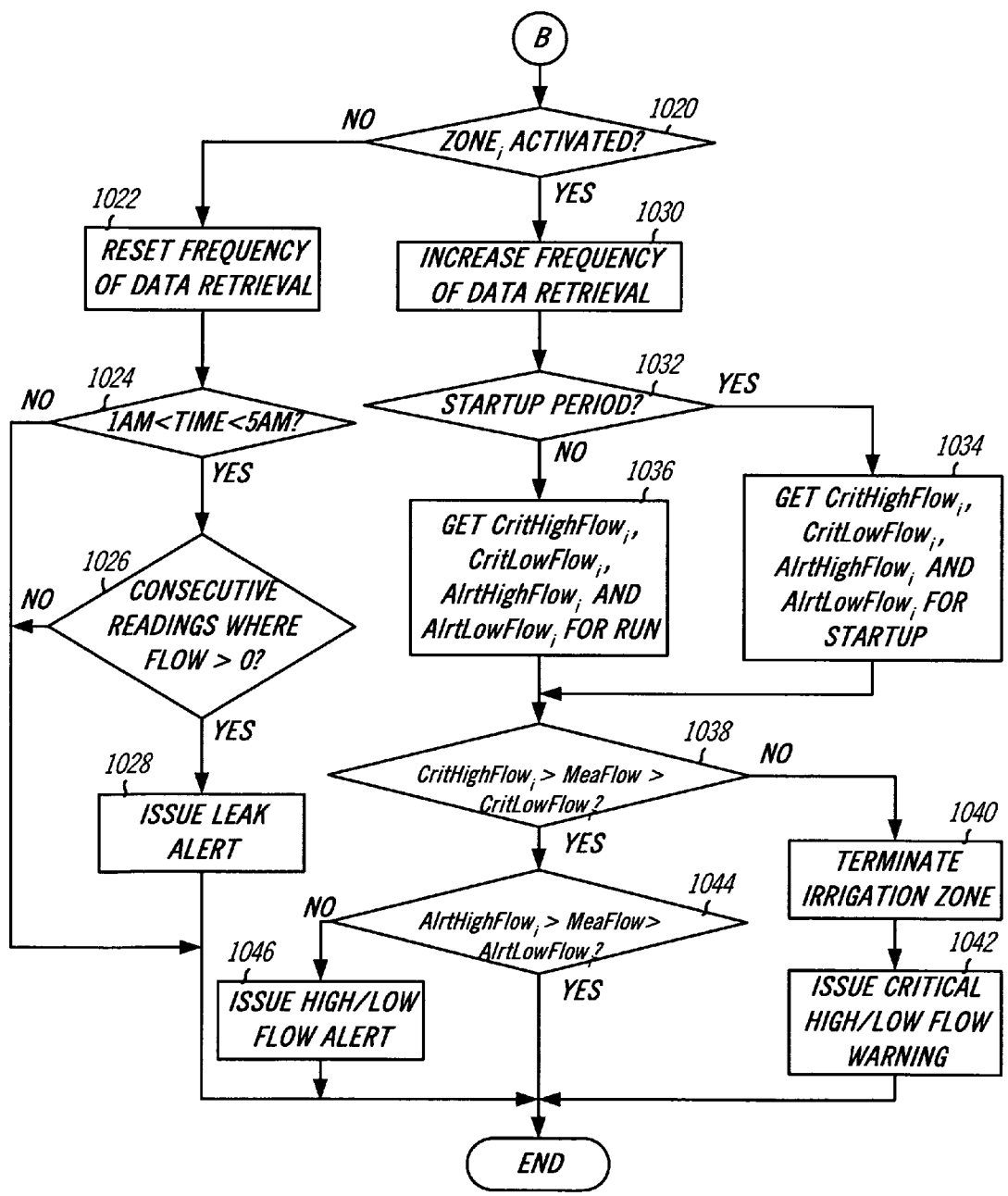

FIGS. 10A and 10B is a flowchart depicting a method for monitoring the health of irrigation and household plumbing and AMR device using an AMR-irrigation system in accordance with an exemplary embodiment of the present invention. The process begins by interrogating the AMR-irrigation system, either by receiving data that are autonomously sent from the AMR or by sending a data request to the AMR device (step 1002). In either case, a data message is received at the IWMI controller which contains at least water use information, which is extracted from the message as discussed above with regard to the process for communicating with an AMR-irrigation system in FIG. 7 (step 1004). The water data may consist of only a cumulative usage number or for more advanced AMR-irrigation systems, may include water use, the current flow rate, historical use and AMR health information. Assuming the message contains only cumulative water usage information, the IWMI controller calculates the amount of water used since the last AMR message was received (step 1006) and then calculates the average flow rate between the two most recent messages by dividing the measured water usage by the elapsed time between the messages (step 1008).

Next, the IWMI controller checks the measure flow and/or measure or calculated flow rate with a critical high flow rate, e.g., MeaFlow>M×MaxHistFlow, where M is a variable from Table II (step 1010). If MeaFlow>M×MaxHistFlow, then the IWMI controller takes immediate action to save the house and property from water damage, such as by closing the master and/or safety valves to the property (step 1012) and issues a critical high flow warning to the operator (step 1014). It should be mentioned that in certain conditions it may be necessary to exceed M×MaxHistUse without the IWMI controller turning off the water supply, such as during a fire. For those cases, the IWMI controller may have a highly visible manual override for terminating the automated shutoff.

Assuming at step 1010, the current measured MeaUse<M×MaxHistFlow, the IWMI controller determined if any of the zones are active, that is if the controller is currently in an irrigation cycle (step 1020). If not, the IWMI controller optionally resets the data retrieval frequency for non-irrigation periods (step 1022). One important period for monitoring household water flow is during a period in which no water flow should be occurring, such as between 1 AM and 5 AM in the morning, a time check is made (step 1024). If the time is within the no-flow rate time period, the IWMI controller tests for a no-flow condition (step 1026). Since it is not a certainty that no flow will be present, due to ice-makers, water softeners, toilet flushes, etc., IWMI controller tests several times. If a no-flow rate condition is not detected in at least one test, the IWMI controller issues a leak alert to the operator (step 1028). If the time is not within the expected no-flow rate time period, or the flow test detects a no-flow condition, the process ends.

Returning to step 1020, if the IWMI controller is currently in an irrigation cycle, the measurements obtained will be related to the irrigation flow rate patterns for the zones. The rate of water flow will change from the startup period to the run period due to slow-opening and/or slow-closing irrigation solenoid valves or the like. The startup period should not last longer than 10 or 15 seconds, after which the flow rate for the zone should stabilize at the run rate for the particular irrigation zone (in order to ensure that the flow rate has stabilized, the startup time period may 20-30 seconds). If the IWMI controller senses it is in the run period (step 1032), it retrieves $CritHighFlow_i$, $CritLowFlow_i$, $AlrtHighFlow_i$, and $AlrtLowFlow_i$ parameters calculated from the historical run flow rates for irrigation zone i (step 1036). If the IWMI controller senses it is in the startup period, it may retrieve optional $CritHighFlow_i$, $CritLowFlow_i$, $AlrtHighFlow_i$, and $AlrtLowFlow_i$ parameters calculated from the historical startup flow rates for irrigation zone i (step 1034). Next, the measured flow rate is checked against the critical high and critical low parameters for the period (step 1038). If the measured flow rate is higher or lower than the critical high and critical low flow parameters, i.e., $MeaFlow_i > CritHighFlow_i$, or $MeaFlow_i < CritLowFlow_i$, the irrigation zone is deactivated (step 1040) and an appropriate critical high or low warning is issued to the operator (step 1042). Optionally, in a critical low condition the irrigation zone may be allowed to continue active and irrigation to continue. If the measured flow rate falls between the critical high and critical low flow parameters, $CritHighFlow_i > MeaFlow_i > CritLowFlow_i$, the measured flow rate is checked against the abnormal low and abnormal high parameters for the period (step 1044). If the measured flow rate is higher or lower than the abnormal low and abnormal high flow rate parameters, i.e., $MeaFlow_i < AlrtLowFlow_i$ or $MeaFlow_i > AlrtHighFlow_i$, the IWMI controller issues an appropriate low or high flow rate alert to the operator that the current irrigation zone's flow rate is abnormally low or high (step 1046). If, at step 1044, the measured flow rate falls between the abnormal low and abnormal high flow rates, $AlrtHighFlow_i > MeaFlow_i > AlrtLowFlow_i$, the flow is healthy for the irrigation zone and no action is taken by the IWMI controller, the process then ends.

Figure 12B:
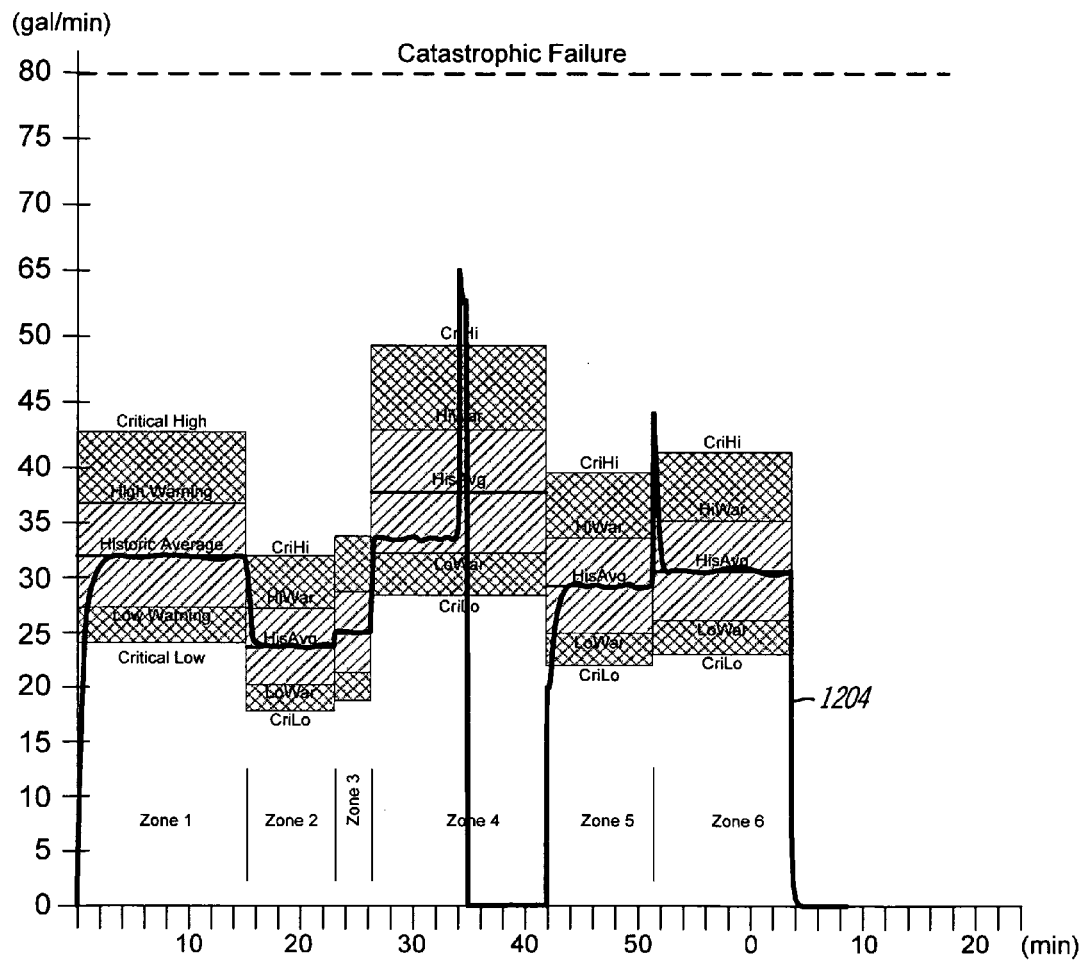

FIGS. 12A and 12B are diagrams depicting two different irrigation cycles and the corresponding irrigation flow rate profiles for the six irrigation zones using the present intelligent water management system in accordance with an exemplary embodiment of the present invention. For simplicity, the exemplary diagrams show only flow parameters for the run rate period and not for the startup period. Turning to FIG. 12A, flow rate profile 1202 shows the solenoid valve for irrigation zone 1 as slow-opening but then reached its historical average flow rate, which may precipitate a low flow warning for the startup period. Notice also that during the startup for zone 2, that the startup flow rate is high, in the warning range again, which is further evidence that irrigation value for zone 1 is experiencing opening and closing difficulties. In zone 4 it is apparent that the run flow rate is below the historic average run rate, but not to the extent that would generate a warning, and the irrigation valves in both zones 5 and 6 are slow-opening, the startup flow rated detected in zone 5 would invoke a critical low warning and the startup flow rated detected in zone 6 would invoke an abnormal low warning to the operator.

Turning to FIG. 12B, flow rate profile 1204 indicates the operation of the irrigation pipe, solenoid valves, and spray heads are operating within the acceptable range for zones 1-3 and the first half of the irrigation cycle for zone 4. Then, the measured flow rate spikes above the critical high threshold. This condition may be a result of a broken irrigation pipe, a sprinkler head popping off or a catastrophic leak developing in some other part of the irrigation or household plumbing systems. Once detected, the IWMI controller immediately deactivates the solenoid valve for zone 4 and monitors the flow rate. If a no-flow condition does not result from deactivating zone 4, the problem is in another part of the system than zone 4 and the IWMI controller may activate the shutoff valve for the property. It a no-flow condition results from deactivating zone 4, it may be assumed that the problem is isolated in zone 4 and the remainder of the irrigation cycle may continue. If the critical flow rate continues in zone 5, the IWMI controller will assume that the irrigation system is compromised and discontinue the irrigation cycle. Flow rate profile 1204 indicates that deactivating zone 4 was successful and so the irrigation cycle continued. Notice, however, that the startup flow rate for zone 6 exceeded critical high flow rate during the startup period without triggering the zone to be deactivated. Under certain conditions the IWMI controller will allow the irrigation flow rate to stabilize at the measured run flow rate before taking any autonomous action other than issuing warnings.

Figure 13A:
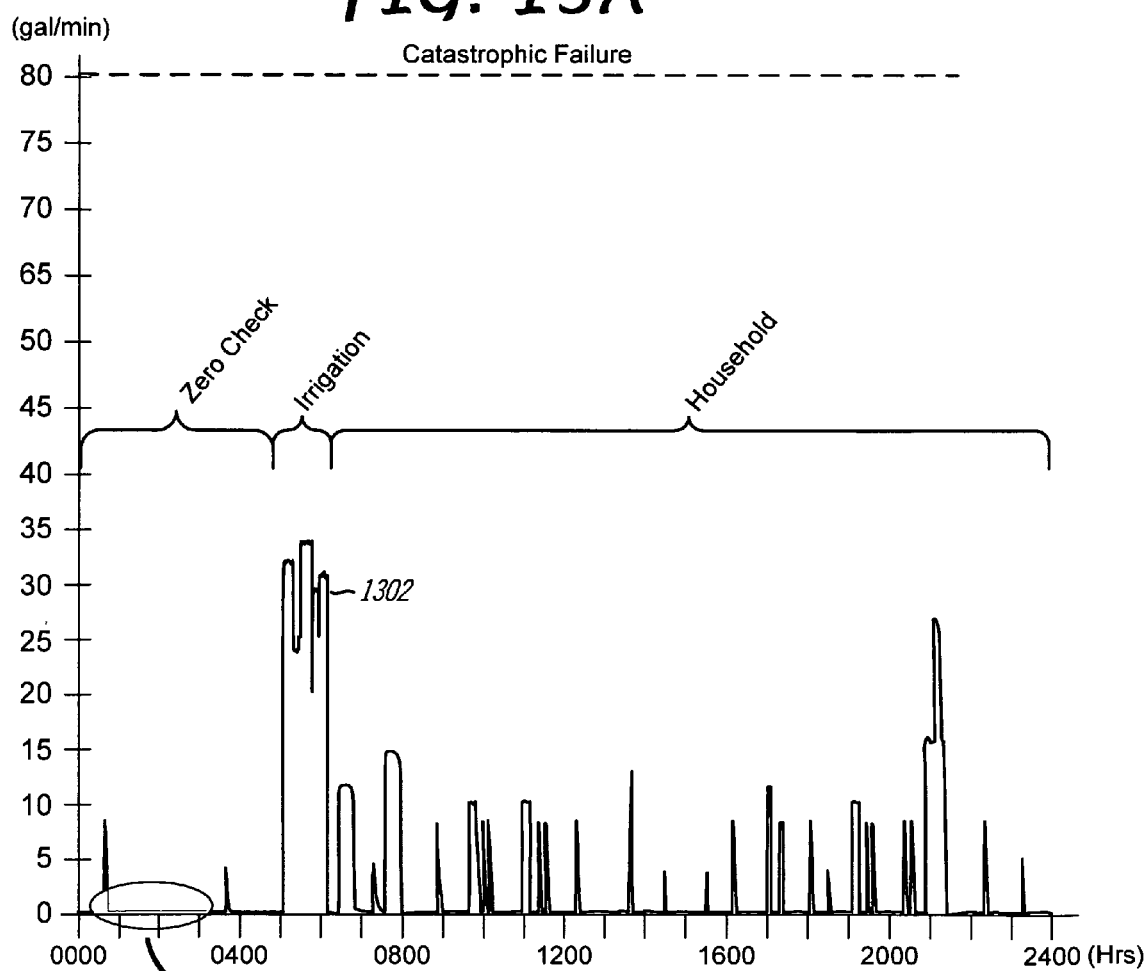
FIGS. 13A and 13B depict a flow rate diagram for a property over a typical irrigation day.
Figure 13B:
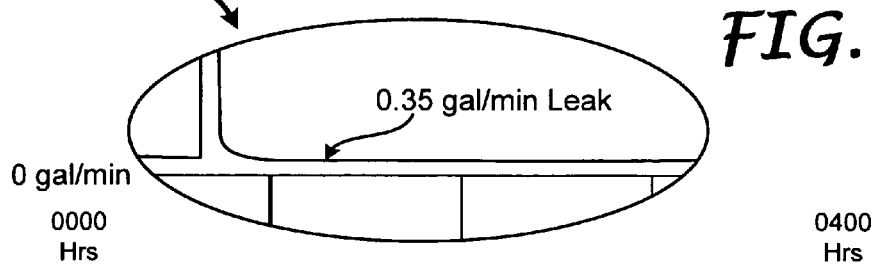

Turning to FIGS. 13A and 13B, a diagram of the flow rate for a property is shown for an irrigation day. The day is subdivided into different periods in which the IWMI controller acts under different constraints, i.e., the zero check period, the irrigation cycle period and the rest of the day where it is assumed that only household water use will occur. Notice from FIG. 13B, that during the early morning hours the IWMI detected a slight water leak and the operator was alerted.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for intelligent irrigation water management implemented by an irrigation controller for a site comprising:
registering cumulative water use information for water used at a site from a single metering device, said site having a plurality of irrigation zones and said cumulative water use comprises irrigation water usage and non-irrigation water usage data;
receiving first cumulative water use information at an irrigation controller for cumulative water used at the site over a first time period;
receiving second cumulative water use information at the irrigation controller for cumulative water used at the site over an irrigation time period, wherein the irrigation time period is within the first time period;
finding a first non-irrigation water use quantity for the first time period by reducing the first cumulative water use by the second cumulative water use;
forecasting a second non-irrigation use water quantity for a second time period;
calculating an irrigation cycle water quantity for a subsequent irrigation cycle in the second time period, said irrigation cycle water quantity comprises a plurality of water zone quantities, each of the plurality of water zone quantities is associated with an irrigation zone of the plurality of irrigation zones;
finding a reduced irrigation cycle water quantity for the subsequent irrigation cycle based on the forecast of the second non-irrigation use water quantity; and
executing the subsequent irrigation cycle at the reduced irrigation cycle water quantity.

2. The method for intelligent irrigation water management recited in claim 1 above, wherein the first and second time periods are equivalent to a water billing time period for the site.

3. The method for intelligent irrigation water management recited in claim 1 above, wherein finding a reduced irrigation cycle water quantity for the subsequent irrigation cycle, further comprises:
receiving a water budget for the site, said water budget defines a maximum non-irrigation water use quantity and irrigation water use quantity to be used at the site during the first and second time periods;
comparing the water budget to a sum of the first cumulative water use information for the first time period, the forecast of the second irrigation use water quantity for the second time period and the irrigation cycle water quantity for the subsequent irrigation cycle.

4. The method for intelligent irrigation water management recited in claim 3 above, wherein finding a reduced irrigation cycle water quantity for the subsequent irrigation cycle based on the forecast of the second non-irrigation use water quantity, further comprises:
receiving a plurality of zone irrigation water priorities, each of the plurality of zone irrigation water priorities is associated with an irrigation zone; and
applying each of the plurality of zone irrigation water priorities to a respective each of the plurality of water zone quantities.

5. The method for intelligent irrigation water management recited in claim 4 above, wherein each of the plurality of zone irrigation water priorities represents a fraction of a plant water requirement of foliage in a respective irrigation zone that is greater than a maintenance fraction of the plant water requirement necessary for keeping the foliage in the respective irrigation zone alive.

6. The method for intelligent irrigation water management recited in claim 1 above, wherein calculating an irrigation cycle water quantity for a subsequent irrigation cycle in the second time period, further comprise:
calculating an evapotranspiration deficit water quantity for each of the plurality of zones at the site during at least a portion of the first time period; and
determining the irrigation cycle water quantity based on the evapotranspiration deficit water quantity.

7. The method for intelligent irrigation water management recited in claim 1 above, wherein calculating an irrigation cycle water quantity for a subsequent irrigation cycle in the second time period further comprises:
forecasting a second irrigation use water quantity for a second time period, said second irrigation use water quantity comprises a plurality of irrigation cycle water quantities.

8. The method for intelligent irrigation water management recited in claim 3 above, wherein calculating an irrigation cycle water quantity for a subsequent irrigation cycle in the second time period, further comprise:
calculating an evapotranspiration deficit water quantity for each of the plurality of zones at the site during at least a portion of the first time period; and
determining the irrigation cycle water quantity based on the evapotranspiration deficit water quantity.

9. The method for intelligent irrigation water management recited in claim 3 above, wherein forecasting a second non-irrigation use water quantity for a second time period, further comprises:
determining a first rate of non-irrigation water use from a ratio of the first non-irrigation water use quantity to the first time period; and
finding the second non-irrigation use water quantity for the second time period using the first rate of non-irrigation water use over the second time period.

10. The method for intelligent irrigation water management recited in claim 3 above, wherein forecasting a second non-irrigation use water quantity for a second time period, further comprises:
retrieving historic non-irrigation water use quantity for a historic time period;
comparing the second time period to the historic time period; and
adjusting the historic non-irrigation water use quantity for the second time period.

11. The method for intelligent irrigation water management recited in claim 3 above, further comprises:
forecasting an irrigation use water quantity for a second time period, said irrigation use water quantity comprises a plurality of irrigation cycle water quantities.

12. The method for intelligent irrigation water management recited in claim 3 above, further comprises:
receiving third cumulative water use information at the irrigation controller for cumulative water used at the site over a third time period;
receiving fourth cumulative water use information at the irrigation controller for cumulative water used at the site over an second irrigation time period, wherein the second irrigation time period is within the fourth time period and the fourth time period is within the second time period;

finding a second non-irrigation water use quantity for the third time period by reducing the third cumulative water use by the fourth cumulative water use;

forecasting a fourth non-irrigation use water quantity for a fourth time period;

forecasting a second irrigation use water quantity for a fourth time period, said second irrigation use water quantity, wherein the second irrigation use water quantity is less than the irrigation use water quantity for the second period.

13. The method for intelligent irrigation water management recited in claim 3 above, wherein registering cumulative water use information for water used at a site, further comprises:

receiving water at a water meter having automatic meter reading capabilities;

measuring water use information; and storing the water use information.

14. The method for intelligent irrigation water management recited in claim 13 above, wherein receiving first cumulative water use information at an irrigation controller for cumulative water used at the site over a first time period, further comprises:

sending an interrogation signal to the water meter;

receiving a response for the water meter, said response including cumulative water use information.

15. A system for implementing intelligent water management at a site comprising:

a site irrigation system, said site irrigation system having a plurality of irrigation zones, each zone having an actuator valve;

an irrigation controller in communication with at least one actuator valve, said irrigation controller comprising:

a communication controller for interrogating a water meter at the site for said cumulative water use information;

valve actuation control circuitry electrically coupled to the at least one irrigation valve;

a memory for storing processor usable program code for intelligent water management; and a processing unit connected to the memory and receptive of the program code, wherein the program code for intelligent water management, when executed by said processing unit, causes the irrigation controller to:

receive first cumulative water use information at an irrigation controller from a single water meter for cumulative water used at the site over a first time period;

receive second cumulative water use information at the irrigation controller from the single water meter for cumulative water used at the site over an irrigation time period, wherein the irrigation time period is within the first time period;

find a first non-irrigation water use quantity for the first time period by reducing the first cumulative water use by the second cumulative water use;

forecast a second non-irrigation use water quantity for a second time period;

calculate an irrigation cycle water quantity for a subsequent irrigation cycle in the second time period, said irrigation cycle water quantity comprises a plurality of water zone quantities for each respective zone in the plurality of irrigation zones;

find a reduced irrigation cycle water quantity for the subsequent irrigation cycle based on the forecast of the second non-irrigation use water quantity; and execute the subsequent irrigation cycle at the reduced irrigation cycle water quantity.

16. The system for implementing intelligent water management recited in claim 15 above, wherein the first and second time periods are within a water billing time period for the site.

17. The system for implementing intelligent water management recited in claim 15 above, wherein the memory stores:

a water budget value for the site, said water budget value defines a maximum non-irrigation water use quantity and irrigation water use quantity to be used at the site during the first and second time periods finding a reduced irrigation cycle water quantity for the subsequent irrigation cycle; and a plurality of zone irrigation water priority values, each of the plurality of irrigation water priority values is associated with one of the plurality of irrigation zones.

18. The system for implementing intelligent water management recited in claim 15 above, wherein the water meter further comprises automatic meter reading capabilities, said communication controller, further comprises:

logic compatible with the automatic meter reading capabilities for communication with the automatic meter reading capabilities of the water meter.

19. The system for implementing intelligent water management recited in claim 15 above, wherein the communication controller, further comprises:

a wireless transceiver for bi-directional communication with the water meter.

20. The system for implementing intelligent water management recited in claim 15 above, wherein the water meter further comprises automatic meter reading capabilities and a communications interface, said system for implementing intelligent water management, further comprises:

a conversion unit for coupling the communication controller to the communications interface of the water meter.

21. A method for intelligent irrigation water management implemented by an irrigation controller for a site comprising:

receiving a water budget quantity at the irrigation controller, the water budget quantity defining a maximum allowable water use quantity for the site over a combined first and second time periods, wherein the maximum allowable water use quantity comprises both irrigation water usage and non-irrigation water usage over the first time period and the second time period;

receiving a first water use quantity at the irrigation controller for the first time period, wherein the first water use quantity comprises at least one of as first irrigation use water quantity over the first time period and non-irrigation use water quantity over the first time period;

forecasting a second non-irrigation use water quantity for the second time period based; and calculating an available irrigation use water quantity for the second time period based on a difference between the water budget quantity and a sum of at least two of the first non-irrigation use water quantity, the first irrigation use water quantity and the second non-irrigation use water quantity.

22. The method for intelligent irrigation water management recited in claim 21 above, further comprises:

calculating an irrigation cycle water quantity for an irrigation cycle scheduled in the second time period, said irrigation cycle water quantity comprises a plurality of irrigation zone water quantities, each of the plurality of irrigation zone water quantities is associated with an irrigation zone of a plurality of irrigation zones;

comparing the irrigation cycle water quantity for the irrigation cycle to the available irrigation use water quantity for the second time period;

finding a reduced irrigation cycle water quantity for the irrigation cycle based on the irrigation cycle water quantity exceeding the available irrigation use water quantity for the second time; and executing the subsequent irrigation cycle at the reduced irrigation cycle water quantity.

23. The method for intelligent irrigation water management recited in claim 22 above, wherein forecasting a second non-irrigation use water quantity for the second time period based, further comprises:

calculating a non-irrigation use water rate for the first time period; and applying the non-irrigation use water rate to the second time period.

24. The method for intelligent irrigation water management recited in claim 22 above, wherein forecasting a second non-irrigation use water quantity for the second time period based, further comprises:

finding a past non-irrigation use water quantity for a historic time period comparable to the second time period; and setting the second non-irrigation use water quantity equal to the past non-irrigation use water quantity.

25. The method for intelligent irrigation water management recited in claim 22 above, wherein the first time period and second time period are equivalent to a water billing time period for the site.

26. The method for intelligent irrigation water management recited in claim 22 above, wherein calculating an irrigation cycle water quantity for an irrigation cycle scheduled in the second time period, further comprises:

calculating a plant water requirement quantity for foliage types in each of the plurality of irrigation zones.

27. The method for intelligent irrigation water management recited in claim 26 above, wherein the plant water requirement quantity utilizes an evapotranspiration value for the site.

28. The method for intelligent irrigation water management recited in claim 27 above, further comprises:

receiving a plurality of zone irrigation water priorities for prioritizing a plant water requirement quantity for a foliage type in one irrigation zone over other plant water requirement quantities for foliage types in other irrigation zones of a plurality of irrigation zones, each of the plurality of zone irrigation water priorities is associated with a unique irrigation zone of the plurality of irrigation zones and each of the plurality of zone irrigation water priorities represents a fraction of a plant water requirement quantity for foliage in a respective irrigation zone that is greater than a maintenance fraction of the plant water requirement quantity necessary for keeping foliage in the respective irrigation zone alive; and wherein finding a reduced irrigation cycle water quantity for the subsequent irrigation cycle, further comprises:

determining a priority water quantity for each of the associated irrigation zones by applying each of the plurality of zone irrigation water priorities to a respective plant water requirement quantity for foliage in the respective irrigation zone.

29. The method for intelligent irrigation water management recited in claim 28 above, wherein determining the priority water quantity for each of the associated irrigation zones, further comprises:

applying each of the plurality of zone irrigation water priorities to a respective crop factor representing a foliage type in each of the associated irrigation zones and the evapotranspiration value for the site.

30. The method for intelligent irrigation water management recited in claim 22 above, wherein calculating an irrigation cycle water quantity for a subsequent irrigation cycle in the second time period, further comprises:

receiving a timed water quantity for the plurality of irrigation zones, wherein the timed water quantity utilizes at least one manually entering irrigation activation time for the plurality of irrigation zones at the site.

31. The method for intelligent irrigation water management recited in claim 21 above, wherein receiving a first use water quantity at the irrigation controller for the first time period, further comprises:

assessing the first irrigation use water quantity over the first time period, comprising:

determining an irrigation time period for the irrigation controller during the first time period; and measuring the first irrigation use water quantity during an irrigation time period.

32. The method for intelligent irrigation water management recited in claim 31 above, wherein receiving a first use water quantity at the irrigation controller for the first time period, further comprises:

assessing the first non-irrigation use water quantity over the first time period, comprising:

determining any irrigation time periods for the irrigation controller during the first time period; and measuring the first non-irrigation use water quantity over the first time period except during any irrigation time period for the irrigation controller.

33. The method for intelligent irrigation water management recited in claim 21 above, wherein receiving a first use water quantity at the irrigation controller for the first time period, further comprises:

registering first cumulative water use information for water used at the site over the first time period, wherein the cumulative water use information comprises both the first irrigation use water quantity and the first non-irrigation use water quantity;

assessing the first irrigation use water quantity over the first time period, comprising:

determining an irrigation time period for the irrigation controller during the first time period; and measuring the first irrigation use water quantity during an irrigation time period; and reducing the first cumulative water use information by the first irrigation use water quantity for the irrigation time period.

34. A method for intelligent irrigation water management implemented by an irrigation controller for a site comprising:

receiving a water use quantity at the irrigation controller for a first time period, wherein the water use quantity comprises at least a first non-irrigation use water quantity and a first irrigation use water quantity;

forecasting a second non-irrigation use water quantity for a second time period;

calculating an available irrigation use water quantity for the second time period based on at least one of the water use quantity, a historical non-irrigation use water quantity and the first non-irrigation use water quantity;

calculating an irrigation cycle water quantity for a subsequent irrigation cycle in the second time period, said irrigation cycle water quantity comprises a plurality of water zone quantities, each of the plurality of water zone quantities is associated with an irrigation zone of the plurality of irrigation zones;

finding a reduced irrigation cycle water quantity for the subsequent irrigation cycle based on one of the second non-irrigation use water quantity and the available irrigation use water quantity; and executing the subsequent irrigation cycle at the reduced irrigation cycle water quantity.

35. A method for intelligent irrigation water management implemented by an irrigation controller for a site comprising:

receiving a plurality of zone irrigation water priorities for prioritizing a plant water requirement quantity for a foliage type in one irrigation zone over other plant water requirement quantities for foliage types in other irrigation zones of a plurality of irrigation zones, each of the plurality of zone irrigation water priorities is associated with a unique irrigation zone of the plurality of irrigation zones and each of the plurality of zone irrigation water priorities represents a fraction of a plant water requirement quantity for foliage in a respective irrigation zone that is greater than a maintenance fraction of the plant water requirement quantity necessary for keeping foliage in the respective irrigation zone alive;

calculating an irrigation cycle water use quantity for a subsequent irrigation cycle, said irrigation cycle water use quantity comprises a plurality of water zone quantities, each of the plurality of water zone quantities is associated with an irrigation zone of the plurality of irrigation zones;

finding a reduced irrigation cycle water quantity for the subsequent irrigation cycle, comprises:

determining a priority water quantity for each of the associated irrigation zones by applying each of the plurality of zone irrigation water priorities to a respective plant water requirement quantity for foliage in the respective irrigation zone; and dispersing the reduced water zone quantity across the plurality of irrigation zones during the subsequent irrigation cycle.

36. The method for intelligent irrigation water management recited in claim 35 above, further comprises:

determining an available irrigation use water quantity for the subsequent irrigation cycle; and comparing the irrigation cycle water use quantity for the subsequent irrigation cycle to the available irrigation use water quantity for the subsequent irrigation cycle, wherein finding the reduced irrigation cycle water quantity for the subsequent irrigation cycle is based on the irrigation cycle water use quantity being greater than an available irrigation use water quantity for the subsequent irrigation cycle.

37. The method for intelligent irrigation water management recited in claim 36 above, wherein calculating the irrigation cycle water use quantity for the subsequent irrigation cycle, further comprises:

calculating a plant water requirement quantity for foliage types in each of the plurality of irrigation zones.

38. The method for intelligent irrigation water management recited in claim 37 above, wherein the plant water requirement quantity utilizes an evapotranspiration value for the site.

39. The method for intelligent irrigation water management recited in claim 38 above, wherein determining the priority water quantity for each of the associated irrigation zones, further comprises:

applying each of the plurality of zone irrigation water priorities to a respective crop factor representing a foliage type in each of the associated irrigation zones and the evapotranspiration value for the site.

* * * * *